United States Patent [19]
Turchan

[11] Patent Number: 5,803,683
[45] Date of Patent: Sep. 8, 1998

[54] MILLING SYSTEM

[76] Inventor: Manuel C. Turchan, 42288 Crestview Cir., Northville, Mich. 48167

[21] Appl. No.: 903,654

[22] Filed: Jul. 31, 1997

Related U.S. Application Data

[60] Continuation of Ser. No. 444,221, May 18, 1995, abandoned, which is a division of Ser. No. 875,231, Apr. 28, 1992.

[51] Int. Cl.$^6$ ...................................................... B23Q 3/06
[52] U.S. Cl. ............................................ 409/277; 269/310
[58] Field of Search ..................................... 409/277, 276, 409/219, 220, 225, 218, 903, 308, 309; 269/291, 292, 297, 22, 329, 310, 264, 31, 250

[56] References Cited

U.S. PATENT DOCUMENTS

| | | | |
|---|---|---|---|
| 2,338,603 | 1/1944 | Schultz | 409/277 |
| 2,648,260 | 8/1953 | McKinley et al. | 409/277 |
| 3,998,444 | 12/1976 | Stockwell | 269/310 X |
| 4,642,438 | 2/1987 | Beumer et al. | 269/250 X |
| 4,697,799 | 10/1987 | Wickham | 269/329 X |
| 4,811,962 | 3/1989 | Cameron, Jr. | 269/22 |

FOREIGN PATENT DOCUMENTS

| | | | |
|---|---|---|---|
| 2722781 | 11/1978 | Germany | 409/218 |
| 632508 | 11/1978 | U.S.S.R. | 409/276 |

*Primary Examiner*—William R. Briggs
*Attorney, Agent, or Firm*—Vanophem Meehan & Vanophem, P.C.

[57] ABSTRACT

A very high speed adiabatic face milling machine whose configuration and operation provide a highly efficient machining process suitable for production manufacturing conditions. The milling machine preferably operates at speeds of approximately 15,000 sfm and at efficiencies of approximately 7 cubic inches per minute per horsepower. The preferred milling operation is conducted without the use of cooling liquids, instead employing a chip removal system which enables the milling machine to operate truly adiabatically such that no heat is transferred to the workpiece or the cutter. The efficiency of the chip removal system is such that chip recutting is nearly eliminated and tool life is improved. The milling machine also includes an improved cutter structure, fixturing, and transfer devices.

9 Claims, 12 Drawing Sheets

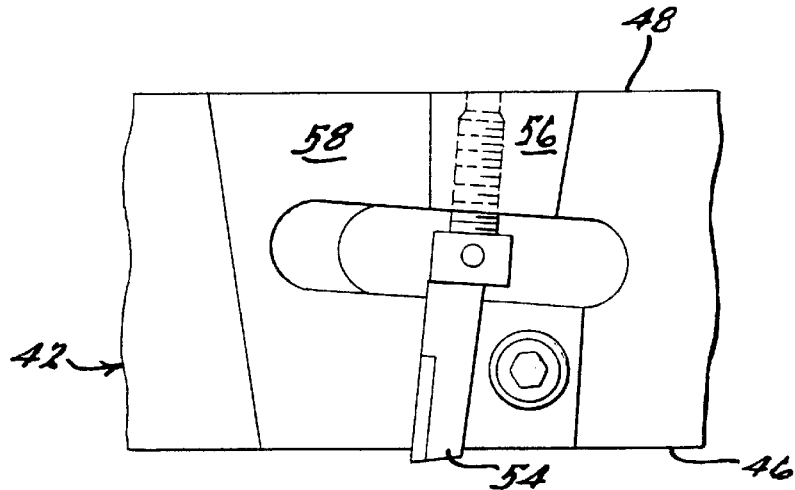
FIG-9
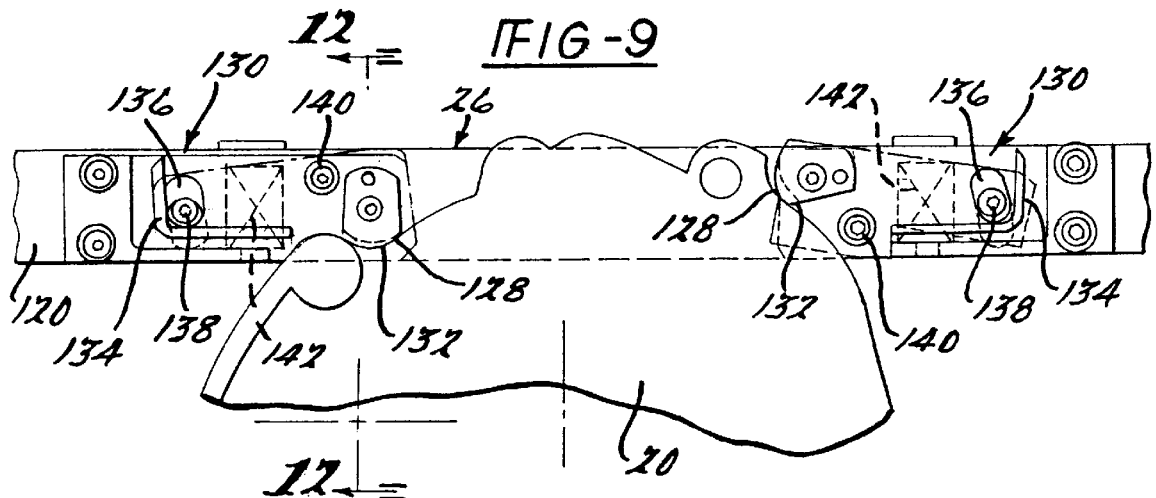
FIG-10
FIG-11

MILLING SYSTEM

This is a continuation of application Ser. No. 08/444,221, filed May 18, 1995, abandoned, which is a division of application Ser. No. 07/875,231, filed Apr. 28, 1992.

BACKGROUND OF THE INVENTION

1. Field of the Invention

The present invention generally related to milling machines and their use in milling nonferrous metals, such as aluminum. More specifically, this invention relates to a face milling machine whose construction and operating parameters provide for an adiabatic very high speed machining process with improved tool life and operating efficiencies, wherein the chips are evacuated from the workpiece and the cutter without the use of cooling liquids or lubricants. In addition, the milling machine includes accessories that further promote the adiabatic operation, precision and efficiency of the milling operation.

2. Description of the Prior Art

Milling machines are widely used in manufacturing processes for producing close tolerance parts, from flat surfaces to slots, keyways and various complex contours. In particular, face milling machines are employed where planar surfaces are to be machined to flatness tolerances of 0.003 inches (0.076 millimeters) and less. Face milling machines typically include a spindle which is rotatably held perpendicular to the surface of a workpiece. The cutting element, or cutter, is generally a disc mounted to the end of the spindle. The cutter has a number of teeth formed on, or alternatively, a number of cutting inserts mounted at, its perimeter, such that the outside diameter of the cutter removes the stock from the workpiece being machined. The cutter is rotated by the spindle, which in turn is driven by a motor of suitable horsepower. Cooling liquids are commonly used to lubricate, cool and flush chips from the workpiece and cutter. Finally, the workpiece and spindle are moved relative to each other to feed the workpiece into the cutter, denoted as the feed rate and traditionally measured in inches per minute. Alternatively, feed rates are provided in inches per tooth, given by the formula:

$$FR/((RPM)(t));$$

where FR is the feed rate (the rate of relative movement between the workpiece and the spindle) in inches per minutes, RPM is the rotational speed of the spindle in revolutions per minute, and t is the number of cutting teeth or inserts on the cutter.

Cutting speed, and its relation to feed rate, is of primary importance if a milling machine is to efficiently produce close tolerance, high surface quality parts. In the past 25 years, particular attention has been concentrated on cutting speed and its effects on the quality and efficiency of the milling process. Cutting speeds are indicated in surface feet per minute (sfm) which can be calculated by the following formula:

$$2\pi(r)(RPM);$$

where r is the radial dimension of the cutting teeth from the spindle's axis of rotation in feet, and RPM is the rotational speed of the spindle in revolutions per minute. Appropriate cutting speeds are dependent upon several factors—primarily the material being cut and the material of the teeth or cutting inserts used, with nonferrous metals, such as aluminum, and carbide cutting inserts usually allowing for higher cutter speeds.

No one classification of cutting speeds has been generally accepted, but the 16th Volume of the Metals Handbook (9th Edition) entitled "Machining" and published by the American Society of Metals, suggests that cutting speeds can be classified as follows. Conventional cutting speeds are below 2000 sfm for nonferrous metals, and often less than 500 sfm for ferrous metals. Higher speeds of 2000 to 6000 sfm are deemed high speed machining, speeds of 6000 to 60,000 sfm are deemed very high speed machining, and speeds greater than 60,000 sfm are ultrahigh speed machining. Obviously, one advantage to higher machining speeds is faster machining time and thus higher production rates. A significant additional benefit to high speed machining is that, past a critical cutting speed which is characteristic of the particular material being machined, cutting forces actually decrease with increased spindle speed until a minimum is reached, which is again a characteristic of the given workpiece material. Accordingly, cutting forces at higher speeds can actually be comparable to or less than that at conventional speeds. Low cutting forces are not only desirable from the standpoint of the power requirement of the spindle's motor, but are particularly desirable when machining very thin, nonrigid workpieces.

Finally, an additional benefit to high speed machining is the ability to achieve a substantially adiabatic cutting operation in which nearly all of the heat generated during the machining process is transferred to th chips formed, thus keeping the cutter and the workpiece essentially at their original pre-machining temperatures. In addition to being able to handle the workpieces immediately after machining, other significant advantages to achieving an adiabatic operation are improved cutting efficiency, less spindle power, lower noise levels, higher precision cuts, less workpiece deflection, and improved tool life. Again, such advantages are particularly beneficial when machining thin, nonrigid workpieces.

Moreover, a coolant is not always needed under adiabatic machining conditions, and in fact may adversely serve to transfer heat from the chips back to the workpiece and cutter. Though cooling liquids generally improve tool life and the appearance of the machined surface, they require extensive delivery, filtering and often cooling systems. Also, the use and disposal of cooling liquids are a growing health and environmental concern. Accordingly, dry machining provides several significant advantages over the use of coolants.

However, to sustain a truly adiabatic cutting operation, particular attention must be given to the type of material being cut and the material of the teeth or cutting insert, the appropriate feed, speed and depth of cut, the precision by which the spindle is supported relative to the workpiece, the stiffness of the cutter, and the ability of the fixturing to rigidly and accurately support the workpiece.

To date, practically all scientific investigation in the area of high speed adiabatic machining of aluminum has been limited to small end mills (0.5 to 1 inch in diameter) at speeds from approximately 10,000 to approximately 60,000 rpm—or roughly 2600 to 15,700 sfm. In practice, such high rotational speeds are severely limited by bearing size, with smaller bearings allowing higher rotational speeds. However, smaller bearings simultaneously limit spindle power and stiffness, resulting in cutting speed being inversely proportional to power and stiffness. Consequently, cutting forces and horsepower limitations have effectively constrained testing to much lower speeds—typically, below 5000 sfm—for purposes of developing milling machines which are practical for use in production manufacturing. Simultaneously, stiffness of the spindle and the manner in which the cutter is mounted to the spindle has also limited cutter size, significantly limiting material removal rates.

In terms of cutting efficiency or unit power (cubic inches per minute per horsepower), the industry has generally concluded from testing thus far that, though cutting forces and specific power are reduced at higher speeds, these advantages tend to diminish above speeds of 5000 sfm. Maximum unit power for machining aluminum is generally believed to be approximately 3 and as much as 4 cubic inches per minute per horsepower at about 5000 sfm, with horsepower available from current motor technology being limited to approximately 30 horsepower at these high spindle speeds. Accordingly, to achieve higher material removal rates in excess of 40 cubic inches per minute generally requires higher-torque drive motors which result in lower cutting speeds, defeating the advantages of high speed cutting.

Moreover, cutting tool manufacturers do no recommend using cutting speeds in excess of 3000 sfm for aluminum cutting with diamond under realistic production manufacturing conditions, though a few recognize speeds as high as 12,000 sfm as being viable. However, such higher speeds have generally been limited to carbide and diamond cutting tools. Diamond cutting tools, such as polycrystalline diamond (PCD)-tipped carbides, have recently become popular for cutting aluminum because of improved tool life— by a factor of 10 to 100 over tungsten carbide cutting tools. However, diamond cutting tools are relatively brittle and are therefore limited by the ability of the milling machine's stiffness and workpiece stability to avoid impact loads caused by workpiece and cutter vibration, particularly at higher cutting speeds. Accordingly, diamond tool manufacturers currently recommend maximum cutting speeds of 1500 to 2500 sfm.

From the above discussion, it can be readily appreciated that the prior art testing does not suggest or support advantages to machining aluminum at speeds in excess of 5000 sfm. Generally, the limitations of high speed milling include spindle stiffness, excessive horsepower requirements, and cutting tool limitations, spindle/cutting tool interface limitations, and machine feed rate capability. Accordingly, high speed milling has not been widely employed under typical manufacturing conditions, even where there is a need to surface machine thin workpieces. As a result, the industry conventionally has turned to grinding for such applications. However, even where the above limitations have been achieved under strict laboratory test conditions, the prior art has failed to achieve high material removal rates, particularly in terms of specific power (i.e. cubic inches per minute per horsepower).

Accordingly, what is needed is a cost-efficient adiabatic milling machine capable of operating without cooling liquids at very high speeds, while affording improved tool life and material removal rates and surface finish, and which is particularly adapted to precision milling thin aluminum workpieces in production manufacturing.

SUMMARY OF THE INVENTION

According to the present invention there is provided an adiabatic very high speed face adiabatic milling machine whose configuration and operation provide a highly efficient machining process suitable for production volume manufacturing conditions. The milling machine preferably operates at speeds of approximately 15,000 sfm and at efficiencies of approximately 7 cubic inches per minute per horsepower—a factor of 2 greater than that known in the prior art. Moreover, the preferred milling operation is conducted without the use of cooling liquids, instead employing a chip removal system which enables the milling machine to operate truly adiabatically such that no heat is transferred to the workpiece or the cutter. The efficiency of the chip removal system is such that, unexpectedly, tool life is nearly double that which would be expected otherwise.

In particular, the milling machine of the preferred embodiment includes twin-spindles which move in unison on opposite sides of a base structure to allow for simultaneous machining and repositioning passes relative to two identical groups of workpieces being machined. In addition, the milling machine employs a cutter, spindle, fixturing and transfer devices which are all adapted to contribute to the adiabatic operation, precision and efficiency of the milling process. Having the above attributes, the milling machine of the present invention is able to adiabatically machine and repeatedly produce finished precision workpieces under high volume production manufacturing conditions where flatness and parallelism tolerances are 0.001 inch (0.025 millimeters) or less.

Each spindle is mounted to the base structure so as to be rotatably held nearly perpendicular to the surface of a workpiece. In addition, the base or a portion thereof is slidable in a longitudinal direction of the machine to reciprocate the spindles in unison relative to their respective workpieces at speeds of approximately 550 to 600 inches per minute. The cutters are each a large diameter disc mounted to the end of each spindle with a number of irregularly-spaced diamond cutting inserts mounted near the cutter's perimeter. To prevent cutting at the radially inward "heel" of the inserts, a cam adjustment feature is included between each spindle and the base such that the toe of the spindles can be readily adjusted to present only the radially outward cutting edge of each insert to the workpiece. In addition, each spindle can be finely adjusted to account for different toe requirements between roughing and finishing cuts. Due to added stiffness being induced by the manner in which each cutter is mounted to its spindle, the cutters are capable of being rotated by their respective spindles at high speeds without loss of precision in the cut or damage to the diamond cutting inserts at speeds which otherwise exceed levels recommended by the industry. Moreover, the large diameter of the cutters used permit cutting speeds to be readily attained in the range of 10,000 to 20,000 sfm to achieve an adiabatic machining operation. Finally, the large diameter of the cutters permits very high surface speeds without resorting to high rotational speeds, thereby avoiding the aforementioned limitations resulting from attempts at optimizing bearing size.

Due to the large diameter of the cutter and the high speeds at which it rotates, material removal rates in excess of 7 cubic inches per minute per horsepower are achievable. The large quantity of chips formed during the adiabatic machining operation are eliminated from the area of the cutter and workpiece through the chip removal system. The chip removal system includes a pressure source which generates a pressure differential between an enclosure that peripherally surrounds the cutter and fixturing that both supports and closely surrounds the workpiece. Clearances between the enclosure and fixturing and between the fixturing and the workpiece, provide sufficiently high speed air flow from the ambient surroundings to completely envelope the workpiece. Preferably, the air speed corresponds to the speed of the chips as they leave the cutter to augment the manner by which they are evacuated. As a result, the air flow serves to efficiency and substantially evacuate all the chips from the immediate machining area, preventing heat transfer from the chips back to the workpiece and cutter. Moreover, efficient removal of the chips from the cutting area also prevents recutting of the chips, which would otherwise significantly reduce tool life as well as the overall efficiency of the process.

In addition to having significantly higher rigidity in relation to its mass, the cutter is also specially adapted to assist in excluding chips from between the cutter and workpiece. The cutter is disc-shaped having pockets in its peripheral surface to receive the cutting inserts and gullets which are specifically formed to assist in the elimination of the chips. The cutting inserts are preferably diamond-tipped carbides which perform well at high temperatures and are not prone to galling with nonferrous materials, thereby enhancing the adiabatic capabilities of the milling machine.

The milling machine includes fixturing which also utilizes techniques that induce added rigidity in the workpieces, while reliably clamping and damping each workpiece to enable machining to within small flatness tolerances. Finally, transfer devices are employed to accurately and securely locate the workpieces within the fixture and transfer the workpieces between subsequent stages of the milling machine to enable precision machining of both sides of the workpiece. Each of the above can be programmably controlled to optimize their operation while also minimizing the amount of manpower necessary to operate the milling machine.

According to a preferred aspect of this invention, the cutting speed is specially selected to enhance the adiabatic operation of the milling machine at a high workpiece feed rate through the cutter. The speed and feed of the milling machine are most suited to the machining of nonferrous materials, and more specifically cast aluminum and magnesium alloys. The combination of a very high cutting speed and high feed rate reduces unit power requirements on the order of two times that previously recognized by the prior art. In addition, the lower cutting forces associated with the lower unit power requirements allow for face milling of thin, nonrigid workpieces, such as automotive transmission valve bodies. Consequently, the milling machine of the present invention is also well suited for machining flat surfaces having numerous surface interruptions therein.

In addition, the manner in which the chips are handled after machining further complements the milling machine's adiabatic operation. The chip removal system precludes chips from fouling the workpiece or cutter so as to prevent heat transfer back to the cutter or workpiece. Efficient elimination of the chips from the cutting area also serves to improve tool life. The preferred operation of the milling machine is dry—i.e. without cooling liquids or lubricants. Accordingly, ad added benefit is that the chips can be easily recycled without the need to separate the chips from a liquid in an expensive discrete chip removal system. Moreover, the absence of cooling liquid and lubricant vapors as well as waste allows the machining operation to be conducted in a more environmentally advantageous manner.

Another significant advantage of the present invention is that the use of a large diameter cutter enables the milling machine to operate at very high surface speeds while the added static and torsional rigidity of the cutter promotes accuracy and precision of the cut using diamond cutting inserts. The structure of the cutter enables the cutter to assist in eliminating the chips from the cutting area while also preventing chips from accumulating between the cutter and workpiece. In addition, the orientation of the spindle can be quickly adjusted to ensure that the toe of the cutter is appropriate for the type and condition of cut desired, i.e. roughing or finishing. The cutter can also be adjusted to minimize radial runout for achieving improved surface finish. Accordingly, the orientation and construction of the cutter and spindle is adapted to promote a fully adiabatic machining operation.

Finally, the manner in which the workpieces are fixtured relative to the cutter enables precision machining of thin nonrigid workpieces. Also, the manner in which the workpieces are transferred into and out of the fixturing device promotes precision positioning and machining of the workpieces under high volume production manufacturing conditions.

Accordingly, it is an object of the present invention to provide a face milling machine whose operation is adiabatic and whose cutting speed and feed rate provide material removal rates with lower cutting forces and unit power requirements superior to that of the prior art.

It is a further object of the invention that the milling machine include a dry chip removal system which substantially prevents heat transfer from the chips to the cutter or workpiece so as to enhance the adiabatic machining process.

It is still a further object of the invention that the dry chip removal system include a device for creating a pressure differential between an enclosure surrounding the cutter and the workpiece with the ambient surroundings, wherein the enclosure includes a shroud circumscribing the cutter and as mask having an opening therethrough sized to closely fit the contour of the workpiece so as to create accelerated air flow and create an air curtain effect.

It is another object of the invention that the milling machine include a disc-shaped cutter which is specifically structured to assist in the removal of chips from the cutting environment and to preclude chips from collecting between the cutter and the workpiece.

It is yet another object of the invention that the cutter have enhanced rigidity for precision operation at high cutting speeds.

It is still another object of the invention that the milling machine include a spindle whose orientation to the workpiece is finely adjustable to accommodate both roughing and finishing cuts as well as adjustment for runout tolerances.

It is an additional object of the invention that the milling machine include fixturing which can securely position and damp a workpiece during machining while also inducing added rigidity into thin workpieces and thin portions of workpieces to withstand cutting forces without vibration and obtain satisfactory machined workpieces within required tolerances.

It is yet an additional object of the invention that the milling machine include transfer devices which can secure the workpieces during transporting of the workpieces to the fixture, while also promoting accurate and secure placement of the workpieces for fixturing and machining.

Other objects and advantages of this invention will be more apparent after a reading of the following detailed description taken in conjunction with the drawings provided.

BRIEF DESCRIPTION OF THE DRAWINGS

FIG. 9 is a detailed front view of the cutter in accordance with a preferred embodiment of this invention;

FIG. 10 is a top view of a transfer bar of the milling machine of FIG. 1;

FIG. 11 is a front view of the transfer bar in accordance with a preferred embodiment of this invention;

DETAILED DESCRIPTION OF THE PREFERRED EMBODIMENT

Machine Configuration

Figure 1:
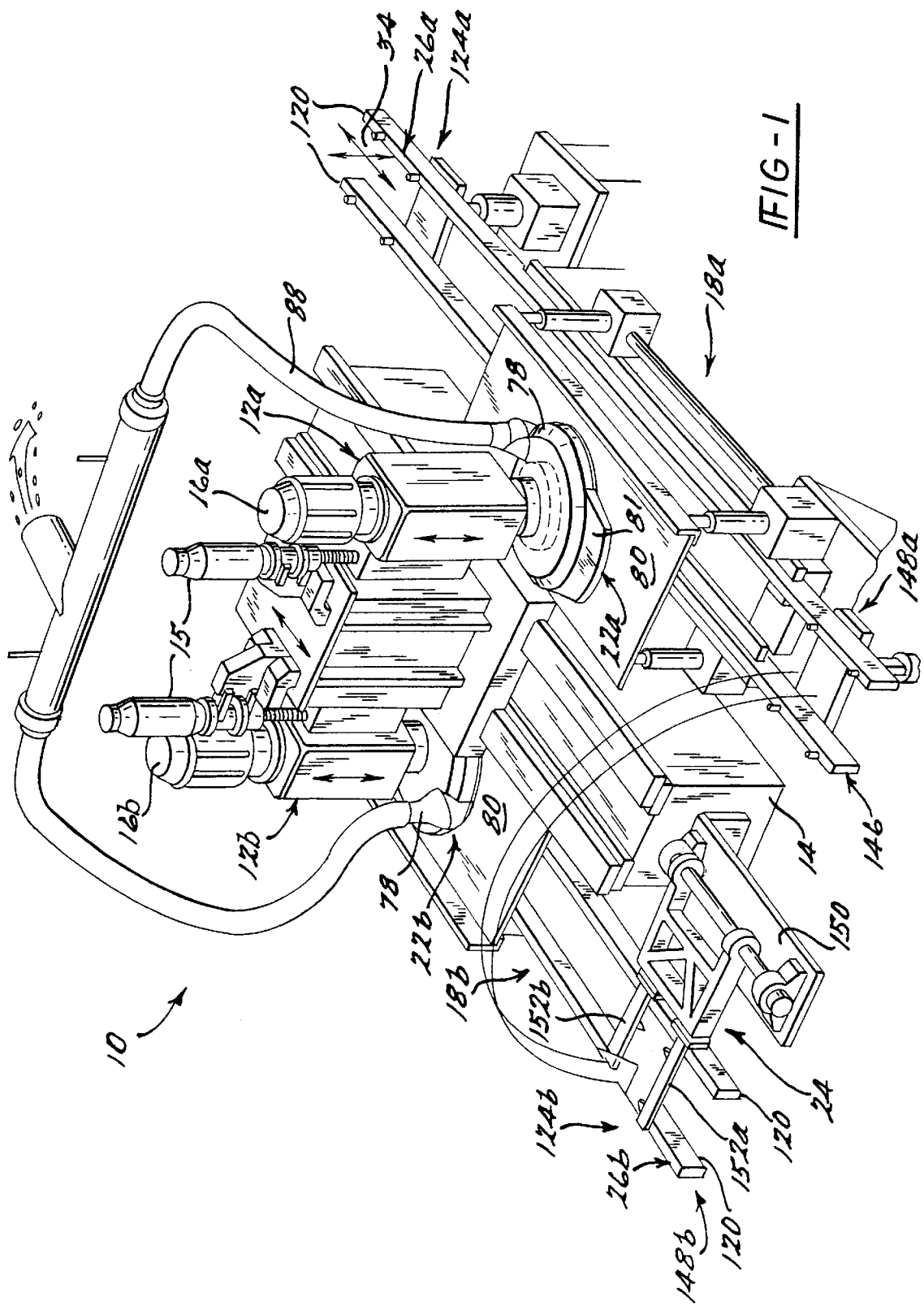
FIG. 1 is a perspective view of a face milling machine in accordance with the preferred embodiment of this invention.
Figure 2:
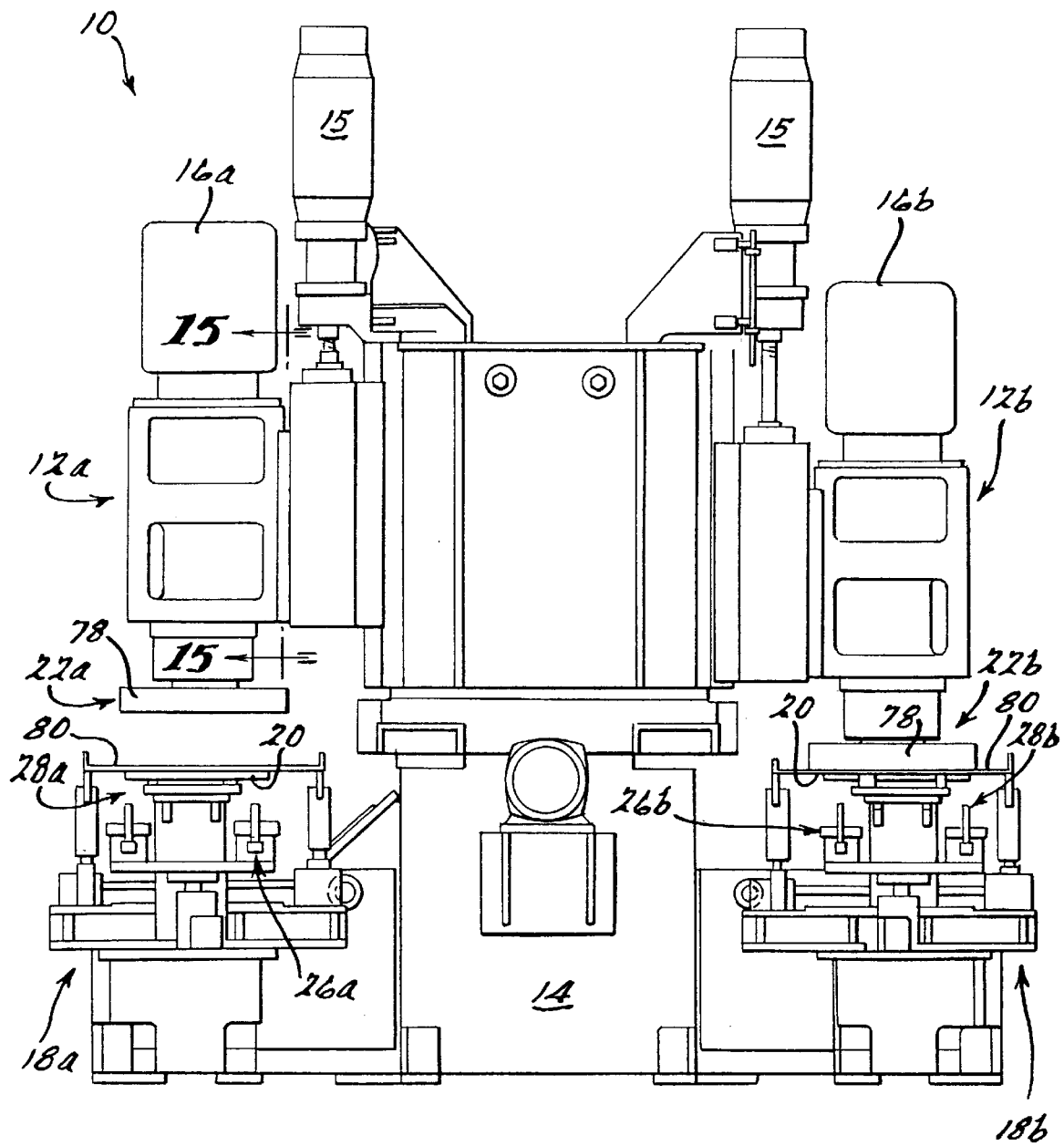
FIG. 2 is a front view of the face milling machine of FIG. 1.
Figure 3:
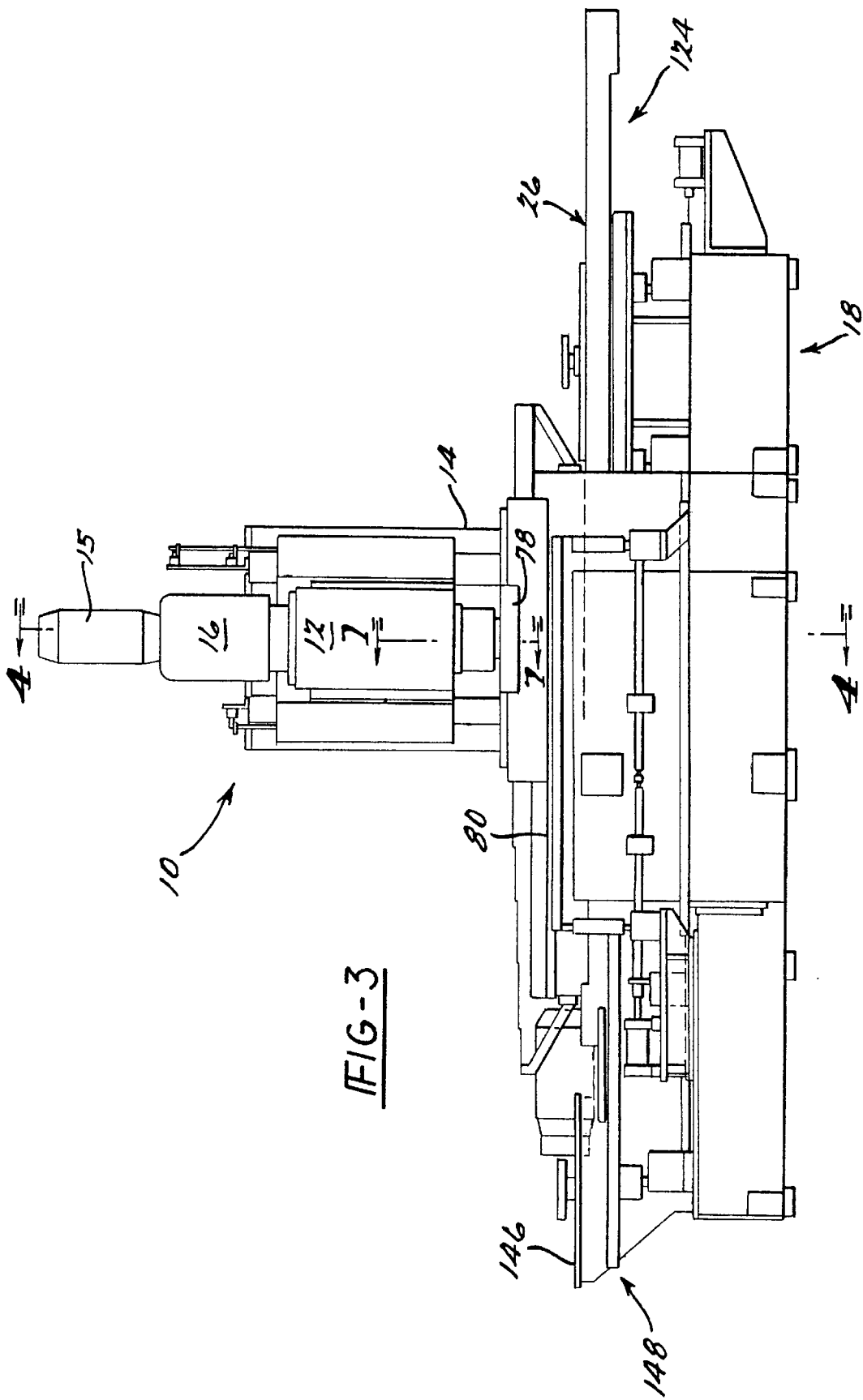
FIG. 3 is a side view of the face milling machine of FIG. 1.
Figure 4:
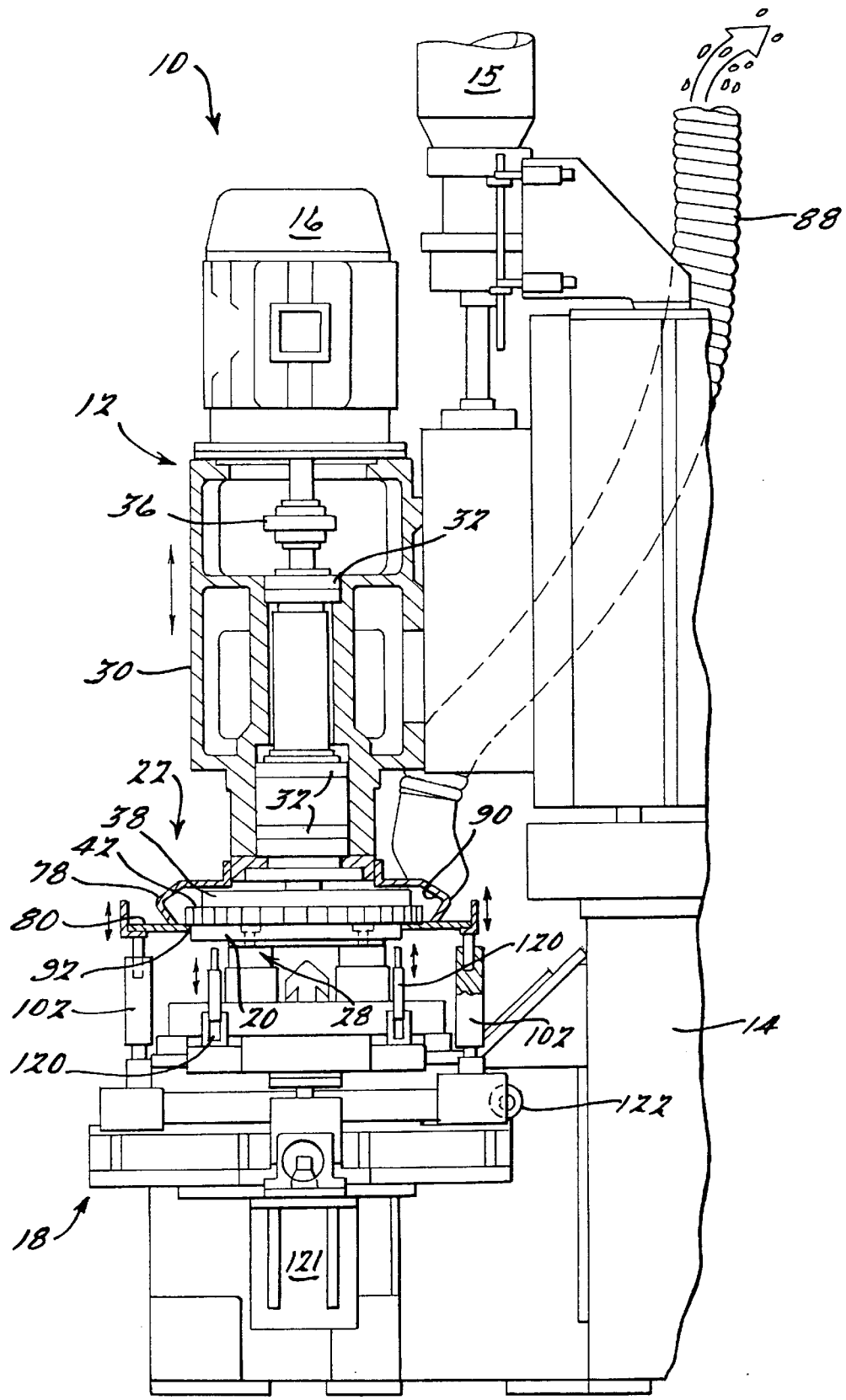
FIG. 4 is a cross-sectional view of the milling machine taken along line 4—4 of FIG. 3.

With reference to FIGS. 1 through 4, there is shown a dual-spindle face milling machine 10 in which a pair of spindles 12a and 12b are mounted on opposite sides of a base 14. The base 14 is equipped with a stroking device (not shown), such as a motor driven ball screw known in the art, which strokes the spindles 12a and 12b in unison in a fore and aft direction. The spindles 12a and 12b are also movable in a vertical direction by any suitable method, such as a motor driven ball screw 15 which strokes both the spindles 12a and 12b and a portion of the base 14 to which the spindles 12a and 12b are attached.

Each spindle 12a and 12b is independently powered by a variable speed motor 16a and 16b of a type known to the art. In the preferred embodiment, each motor 16a and 16b is capable of producing 30 horsepower and speeds of approximately 5000 rpm. However, it is preferable that the motors 16a and 16b draw current only to sustain the rotational speed of the spindles 12. Accordingly, only one motor 16a and 16b draws sufficient current to machine at any given time—i.e. each motor 16a and 16b draws sufficient current to maintain its rotational speed as a workpiece 20 is being machined by its corresponding spindle 12a or 12b, permitting the spindles 12a and 12b to be synchronized to alternate between machining and repositioning operations. As an example, while the first spindle 12a is driven by its motor 16a to perform a machining operation on a workpiece 20, the other spindle 12b also moves in the same direction, but practically coasts under its own inertia as it is being repositioned for its next machining pass.

Each spindle 12a and 12b is provided with a workpiece support structure 18a and 18b upon which the workpieces 20 are supported and transported in sequential fashion to and from a pair of cutting units 22a and 22b corresponding to the pair of spindles 12a and 12b. In the preferred embodiment, the workpieces 20 are transported on each side of the milling machine 10 in groups of three to increase efficiency of one spindle 12 during machining while minimizing the time needed to reposition the other spindle 12. In addition, there is a transfer arm 24 located between the workpiece support structures 18a and 18b for transferring the groups of three workpieces 20 therebetween. After the first cutting unit 22a machines a group of workpieces 20 on a first of two sides of each workpiece 20, the transfer arm 24 rotates the workpieces 20 180 degrees as they are transferred to the next workpiece support structure 18b so as to expose a second side of each workpiece 20 to the second cutting unit 22b.

Consequently, the path of a workpiece 20 is U-shaped around the milling machine 10. One set of workpieces 20 is first transported along the first workpiece support structure 18a to the first cutting unit 22a (i.e. down the upper half of the first leg of the U) and secured by a first set of fixtures 28a (to be described more fully below) to undergo a first machining pass of the first side of the workpieces 20. Simultaneously, a second group of workpieces 20 are being machined at the second cutting unit 22b (on the second leg of the U). During the machining pass of the first spindle 12a (either in a fore or aft direction), the second spindle 12b is moved in the same direction as the first spindle 12a for repositioning so as to be ready for its next machining pass. Subsequently, after the first group of workpieces 20 are machined by the first spindle 12a, they will be further transported down the first workpiece support structure 18a, rotated by the transfer arm 24 over to the second workpiece support structure 18b (i.e. along the base of the U), and transported upon the second workpiece support structure 18b (i.e. up the power half of the second leg of the U) toward a second set of fixture 28b where it is again secured to be machined by the second cutting until 22b. While the second spindle 12b is machining the workpiece 20, the first spindle 12a is being repositioned to machine the next workpiece 20 (both being stroked in a direction opposite the first spindle's 12a machining pass and the second spindle's 12b repositioning pass). Throughout the above process, power is being directed to either spindle 12a or 12b, whichever is machining a workpiece 20, while the remaining spindle 12a or 12b is allowed to almost free wheel, thus conserving power consumption of the milling machine 10. Following the above process, machining of both sides of a workpiece 20 is accomplished. In the preferred embodiment, where separate rough and finish passes are required, two milling machines 10 would be located adjacent each other, with a first milling machine 10 being used to perform a roughing cut, while the second performs a subsequent finishing cut on the same workpieces 20.

Transfer Bar

As illustrated in FIGS. 1, and 10 through 12, the workpiece support structures 18a and 18b each slidably support transfer bars 26a and 26b, respectively, by which the workpieces 20 are transferred to and from the cutting units 22a and 22b. Essentially, the transfer bars 26a and 26b are a pair of beams 120 which are spaced apart a distance less than the length of the workpieces 20 so as to be able to support the workpieces 20 lengthwise. Each beam 120 has a height substantially greater than its width. The lengths of the beams 120 are roughly half the length of the workpiece support structures 18a and 18b to allow reciprocation of the transfer bars 26 along the length thereof by a suitable stroking device 122 (see FIG. 4) mounted to the workpiece support structure 18. The transfer bars 26a and 26b are each stroked between a loading station 124a and 124b and an unloading station 148a and 148b beneath their respective cutting units 22a and 22b.

As best seen in FIG. 10, for each workpiece 20 there is a pair of locking arms 130 attached to the upper edge of each beam 120 at its end corresponding to its loading station 124. The locking arms 130 are each oriented to have its length substantially parallel to its corresponding beam 120. The locking arms 130 are positioned on the beams 120 to locate four corners 128 of the outer periphery of each workpiece 20. The locking arms 130 are each pivotably attached to its respective beam 120 with a pivot pin 140 between an abutment end 132 and a camming end 134 of the locking arm 130. The camming end 134 includes a slot 136 formed in the locking arm 130 which limits the pivoting movement of the locking arm 130 by camming against a pin 138 extending upwardly from the beam 120. Also mounted at the camming end 134 is a spring 142 or other suitable biasing device which biases the camming end 134 outward from the beam 120 so as to bias the abutment end 132 inward toward a corresponding corner 128 of the workpiece 20. As shown, each corner 128 on the workpiece 20 is preferably an arcuate slot sized to fit a corresponding radial contour of the abutment end 132.

Located at each loading station 124a and 124b on the outward side of each beam 120 are a pair of vertical columns 126 corresponding to each pair of locking arms 130. The columns 126 are located relative to their corresponding beam 120 so as to correspond to the location of their corresponding pair of locking arms 130 when the transfer bars 26 are positioned at the loading station 124 by the stroking device 122. The columns 126 each include a lateral arm 144 which extends sufficiently inward to cam against the camming end 134 of a corresponding one of the locking arms 130 when the beams 120 are at the loading station 124. The lateral arms 144 force the camming end 134 of each locking arm 130 inward, which forces the abutment end 132 outward to disengage the corner 128 of the workpiece 20 while the transfer bars 26 remain at the loading station 124.

In operation, a set of workpieces 20 are first loaded onto a platform 34 by any suitable lifting device (not shown). The transfer bars 26 are then raised by a lifting device 121 at the loading station 124 to lift the workpieces 20 from the platform 34. The transfer bars 26 then slidably move along the workpiece support structure 18 in the direction of the cutting unit 22. As the transfer bars 26 leave the loading station 124, the lateral arms 144 disengage their corresponding camming ends 134 of the locking arms 130, allowing the abutment ends 132 of each locking arm 130 to engage its corresponding corner 128 of a workpiece 20, thereby frictionally locking each workpiece 20 in place on the transfer bars 26. Once positioned below the cutting unit 22, the workpiece support structure 18 and the transfer bars 26 are both lowered over a fixture 28 (as hereinafter disclosed) by the suitable lifting device to forcibly disengage the workpiece 20 from the locking arms 130 and engage the workpiece 20 with the fixture 28. Thereafter, while the workpiece support structure 18 is still in the lowered position, the transfer bars 26 are moved back to the loading station 124 to pick up the next set of workpieces 20.

Transfer Arm

Figure 5:
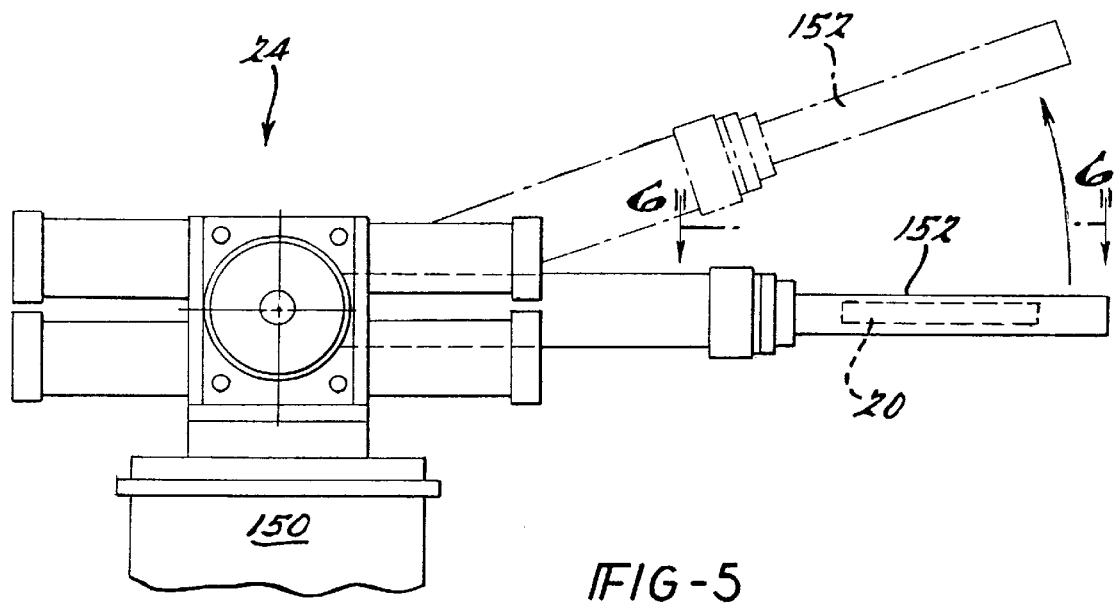
FIG. 5 is a front view of a transfer arm for use with the milling machine of FIG. 1.
Figure 6:
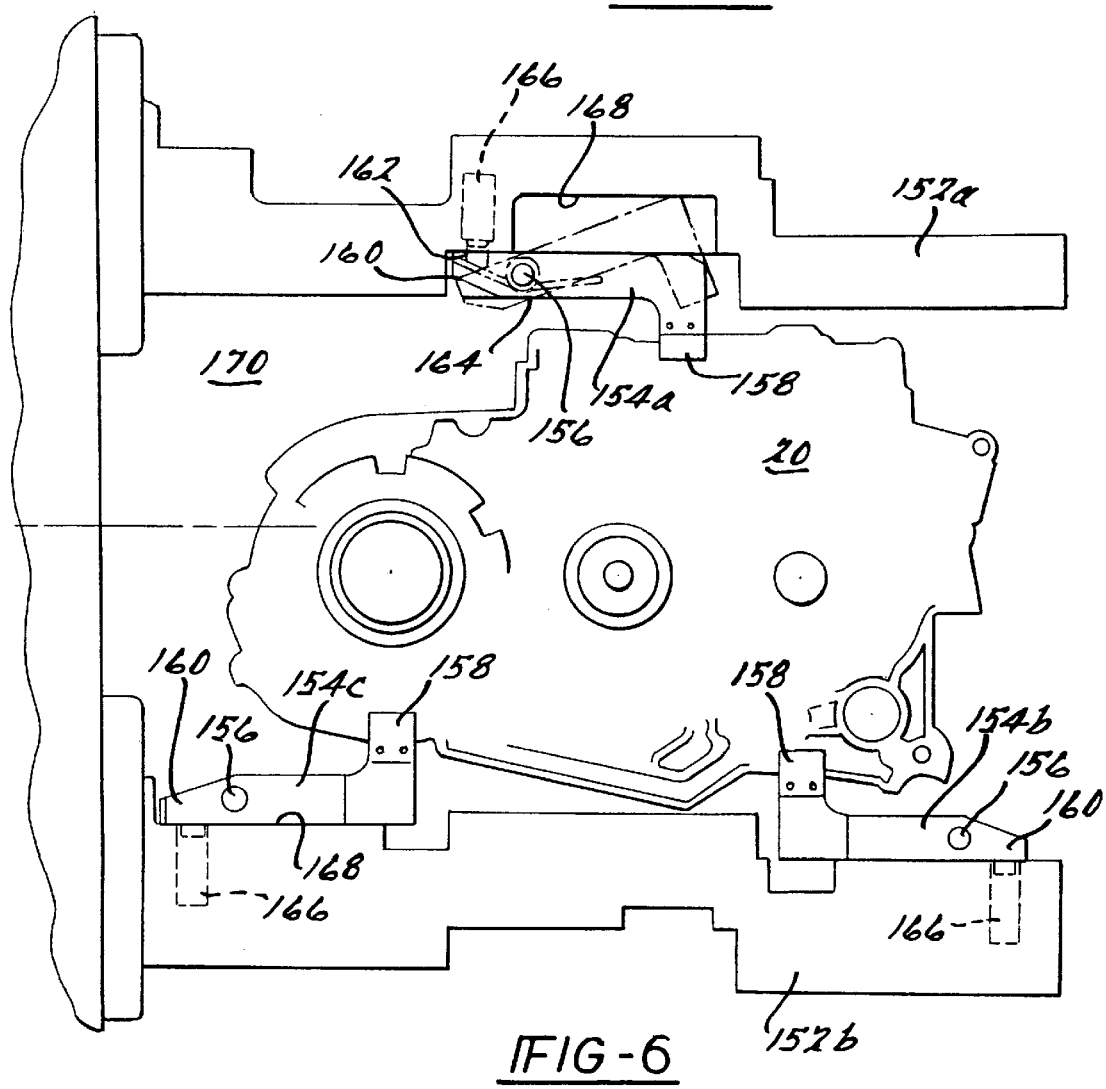
FIG. 6 is a cross-sectional view of the transfer arm taken along line 6—6 of FIG. 5.

Once the machining operation is complete at the cutting unit 22, the workpieces 20 are again lifted off the fixture 28 by a rear portion 146 of the transfer bars 26 at the end of the transfer bars 26 opposite the locking arms 130. The workpieces 20 are then moved to the unloading station 148 of the workpiece support structure 18, where they are grasped by the transfer arm 24. The transfer arm 24, as illustrated in FIGS. 5 and 6, includes a suitable base structure 150 from which the transfer arm 24 rotates between the first workpiece support structure 18a and the second workpiece support structure 18b. The primary function of the transfer arm 24 includes rotating the workpieces 20 so that a machining operation can be performed on their opposite surfaces. However, it is necessary that the workpieces 20 be precisely picked and placed from one side of the milling machine 10 to the other so that the transfer bars 26b corresponding to the workpiece support structure 18b can grasp the workpieces 20 with their corresponding locking arms 130.

To achieve this feature, the transfer arm 24 includes a parallel pair of grasping arms 152a and 152b corresponding to each workpiece 20 to be transferred. The grasping arms 152 extend parallel to each other from the end of the transfer arm 24, as can be seen in FIG. 6. Each adjacent pair of grasping arms 152 is spaced apart to form a slot 170 whose width is sufficient to receive the width of the workpiece 20. The grasping arms 152 each include at least one clamping arm 154. In the preferred embodiment, a first grasping arm 152a has one clamping arm 154a while the second grasping arm 152b has two spaced-apart clamping arms 154b and 154c as shown. As a result, the workpiece 20 is grasped at three points which stabilizes the workpiece 20 as it is transferred between the workpiece support structures 18a and 18b.

Each clamping arm 154 is pivotably secured within a cavity 168 in its grasping arm 152 by a pivot pin 156. Each clamping arm 154 has an engagement end 158 and a stroking end 160 on opposite sides of the pivot pin 156. Accordingly, the engagement end 158 is able to retract into its cavity 168 during repositioning of the transfer arm 24, and extend into the slot 170 between the grasping arms 152 to engage the workpiece 20. A torsion spring 164 biases the clamping arm 154 into the slot 170 to engage the workpiece 20, while a suitable stroking device 166, such as a hydraulic or pneumatic cylinder, is provided to force the clamping arm 154 to retract into the cavity 168 and thus disengage the workpiece 20. The travel of the clamping arm 154 into the slot 170 is limited by a stop 162 formed in the cavity 168 adjacent the stroking end 160 of the clamping arm 154.

In the operation of the transfer arm 24, the workpieces 20 are transported by the transfer bars 26 to the transfer arm 24 after machining. The transfer bars 26 align the workpieces 20 relative to their respective grasping arms 152 such that each workpiece 20 will nest within a corresponding slot 170 once the transfer arm 24 is moved into position. The transfer arm 24 is then rotated upon its base 150 to engage the workpieces 20. With the grasping arms 152 on either side of a workpiece 20, the clamping arm 154a of the first grasping arm 152a is allowed to rotate into the slot 170. The stop 162 sufficiently limits the rotation of the clamping arm 154a such that the clamping arm 154a is prevented from sharply impacting the workpiece 20, which would otherwise misalign the workpiece 20 relative to the transfer arm 24 and subsequently the transfer bars 26b of the second workpiece support structure 18b. As such, the clamping arm 154a serves as a datum point for locating the workpiece 20 relative to the transfer arm 24, the second grasping arm 152b and the transfer bars 26b. Thereafter, the second and third clamping arms 154b and 154c are allowed to rotate into the slot 170 and clamp the workpiece 20 against the first clamping arm 154a. The torsion springs 164 provide sufficient biasing to secure each workpiece 20 as it is rotated by the transfer arm 24 into position for the second pair of transfer bars 26b. Once in place on the second pair of transfer bars 26b, the process is repeated, beginning with the transport of the workpieces 20 to the second cutting unit 22b.

While the preceding description has specifically recited a dual-spindle arrangement for purposes of the preferred embodiment, it will be clear to those skilled in the art that the very high speed adiabatic operation of the milling machine 10, to be described below, is not dependent upon such limited structure. Accordingly, the teachings of the present invention outlined below are not limited to the above described structure or operation.

Spindle

Figure 7:
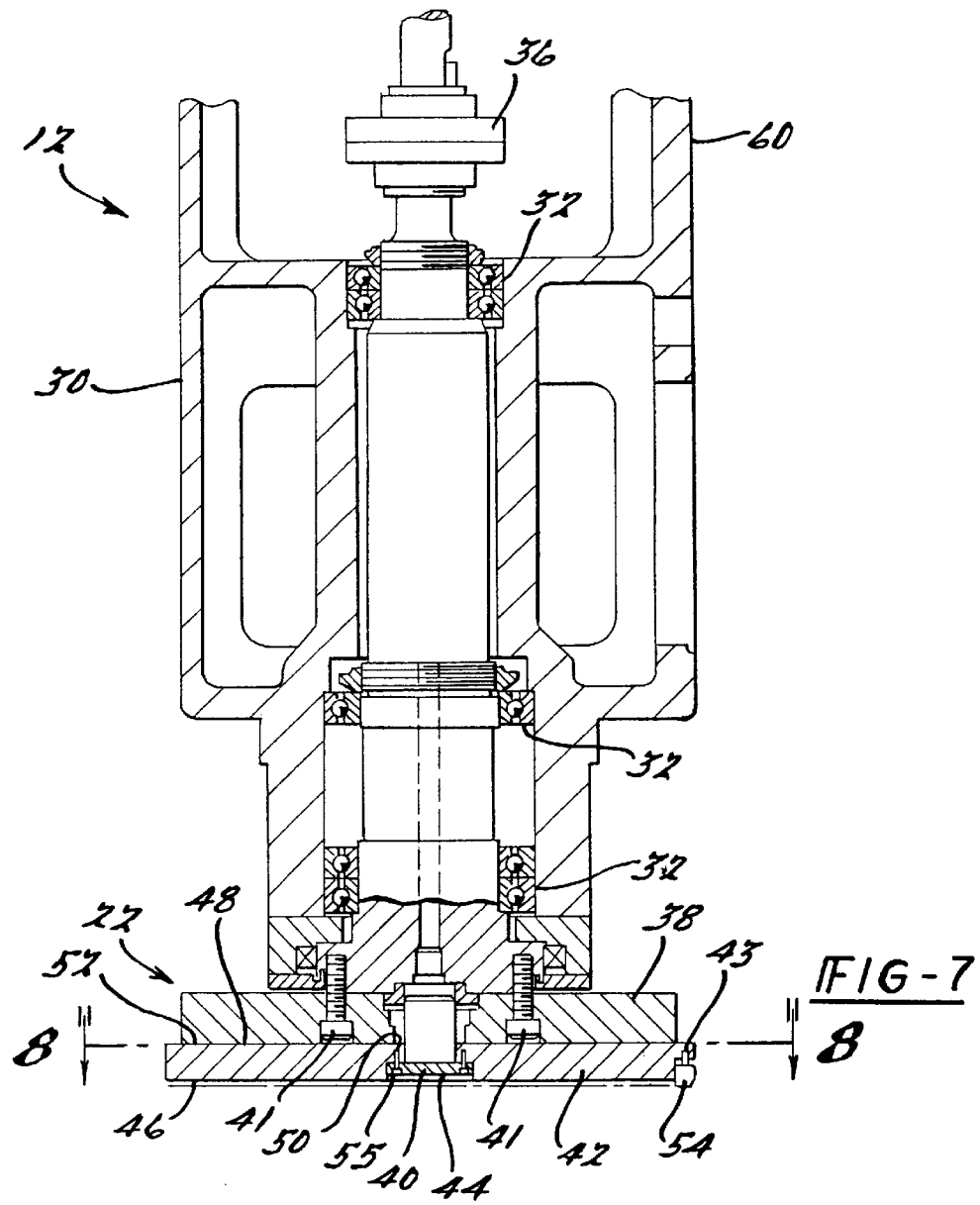
FIG. 7 is a cross-sectional view of the spindle and cutter of the face milling machine taken along line 7—7 of FIG. 3 in accordance with the preferred embodiment of this invention.
Figure 12:
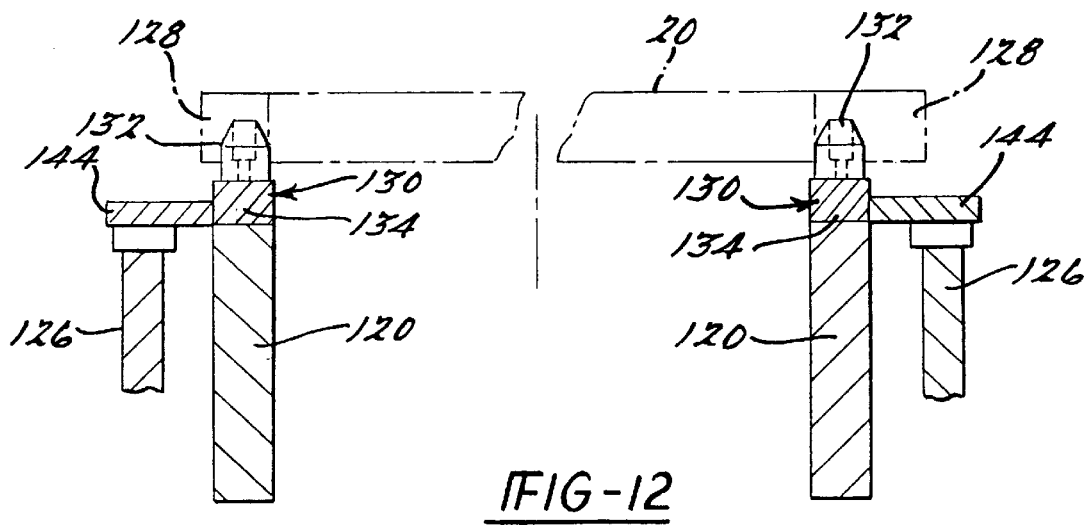
FIG. 12 is a cross-sectional view of the transfer bar taken along line 12—12 of FIG. 10 in accordance with the preferred embodiment of this invention.

As noted above, the face milling machine 10 of the present invention includes the spindles 12 which are mounted to the base 14. As best seen in FIG. 7, the spindles 12 each include a housing 30 within which the spindles 12 are rotatably supported above their corresponding fixture 28. Mounted at the lower end of each spindle 12 is one of the aforementioned cutting units 22. The cutting units 22 are generally oriented perpendicular to the axis of rotation of the spindle 12 and substantially parallel to the fixtured workpieces 20.

Figure 16:
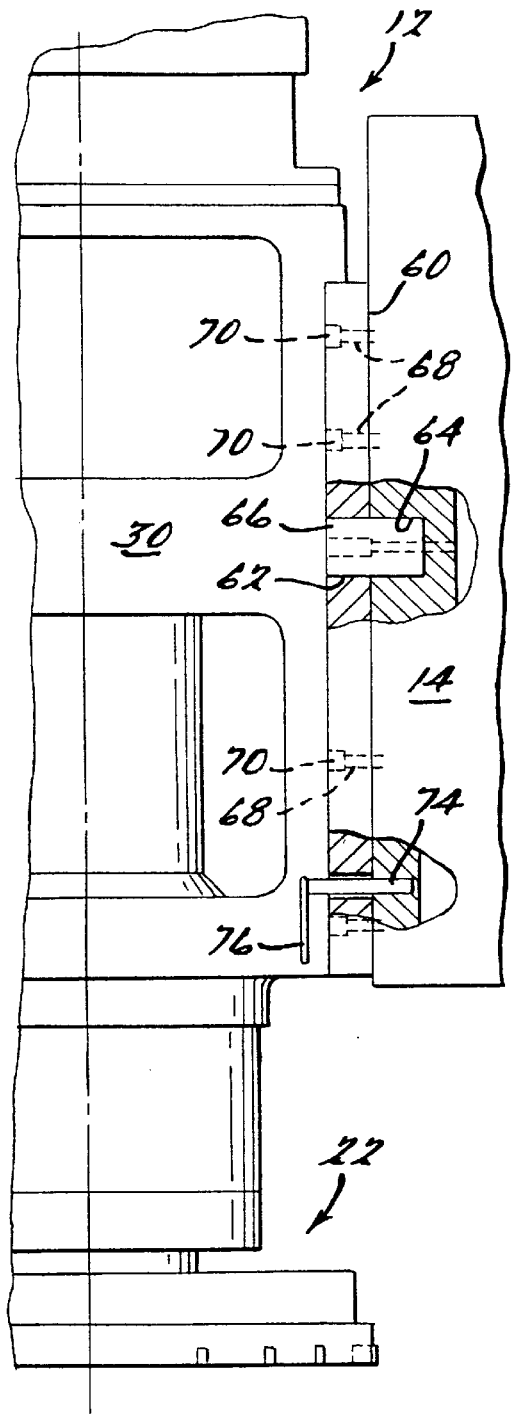
FIG. 16 is a cross-sectional view of the spindle mounting face taken along line 16—16 of FIG. 15 in accordance with a preferred embodiment of this invention.
Figure 15:
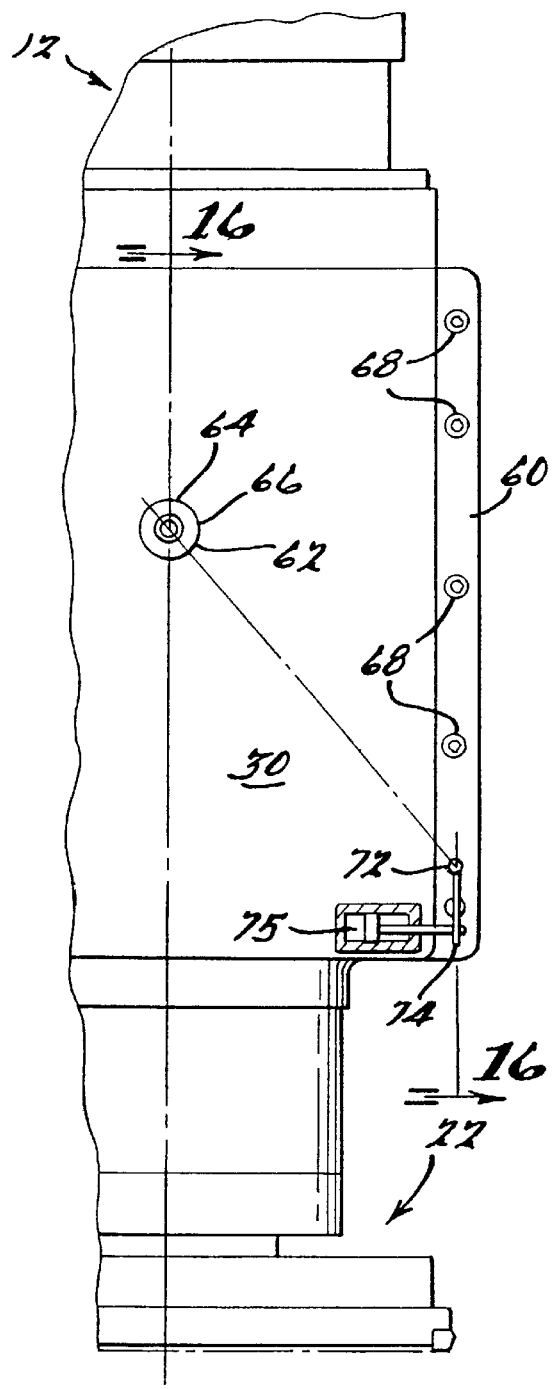
FIG. 15 is a side view of the spindle taken along line 15—15 of FIG. 2 and illustrating its mounting face.

With reference now to FIGS. 15 and 16, each housing 30 includes a mounting surface 60 which abuts the portion of the base 14 which is intended to move vertically with the spindle 12 during its operation. A number of holes 68 are formed along the perimeter of the mounting surface 60 through which slightly undersized bolts 70 can secure the spindle 12 to the base 14. Formed in the upper half of the mounting surface 60 on a vertical line of symmetry is an aperture 62 in which a hardened journal 64 is installed. The journal 64 is sized to receive a shaft 66 extending from the base 14, by which the housing 30 is supported by the base 14. The journal 64 and shaft 66 allow pivotal movement between the spindle 12 and the base 14 when the bolts 70 are sufficiently loosened.

Located on the perimeter of the mounting surface 60 is an opening 72 which serves as a camming surface for an eccentric shaft 74 rotatably extending from the base 14. Attached perpendicularly from the eccentric shaft 74 is a lever 76 by which the eccentric shaft 74 can be rotated. The lever 76 can be either operated by hand or by any suitable device, such as the hydraulic cylinder 75 shown. By rotating the eccentric shaft 74, its camming effect against the opening 72 causes the housing 30 to controllably pivot about the shaft 66. The radial spacing of the opening 72 from the journal 64 enables the spindle 12 to be angularly adjusted relative to a workpiece 20. Accordingly, sufficient toe of the cutting unit 22, i.e. the degree by which the cutting unit's plane of rotation differs from the plane of the workpiece 20, can be provided to avoid impacting the trailing edge of the cutting unit 22 against the workpieces 20 or otherwise creating cross-hatching in the machined surface, both of which result in drastically reduced tool life. The toe can also be selectively altered to adapt to a particular cutting operation, such as a roughing operation or a finishing operation. In the preferred embodiment, the toe for a roughing cut is approximately 0.0025 inches, while the toe for a finishing cut is approximately 0.0005 inches. These settings can be readily obtained by operation of the eccentric shaft 74 within the opening 72.

Moreover, by automating the adjustment of the spindle 12 with a device such as the cylinder 75, the spindle 12 can be pivoted to machine in two directions. As an example of an alternate embodiment employing this method, the spindle 12 can be oriented to provide a 0.0025 inch toe while the workpiece 20 is fed through the cutting unit 22 in one direction to perform a roughing cut; thereafter, the spindle 12 can be pivoted by the eccentric shaft 74 to provide a 0.0005 inch toe in the opposite direction to perform a finishing cut on the workpiece 20. Such an arrangement can, in certain applications, eliminate the need for two separate milling machines 10 which are each dedicated to either a roughing or finishing operation, by providing the capability for bi-directional cutting.

With further reference to FIG. 7, each spindle 12 is supported by bearings 32 whose preloads ensure that the spindle 12 is sufficiently supported for operating at speeds up to approximately 4000 rpm. Each spindle 12 is driven through a coupling 36 by its respective motor 16. The lower end of each spindle 12 extends outside of its housing 30, terminating in the cutting unit 22. Each cutting unit 22 includes an annular-shaped adapter 38 or drive member, a mounting device 40, and a cutter 42. The adapter 38 is mounted directly to the spindle 12 by a number of bolts 41, while the cutter 42 is mounted to the adapter 38 with the mounting device 40. The mounting device 40 preferably employs a ball-locking feature (not shown) which reduces the effort needed to operate the mounting device 40. Such a mounting device 40 is disclosed in U.S. Pat. Nos. 3,498,653 and 4,135,418.

There are two further advantages to the use of this type of mounting device 40 over the conventional method of using mounting bolts and keying the cutter 42 to the spindle 12. Firstly, such a mounting device 40 provides accurate axial mounting of the cutter 42 relative to the spindle 12. Secondly, the mounting device 40 provides infinite radial indexing of the cutter 42 relative to the adapter 38. Such indexing enables the total axial runout at the cutter 42 relative to the workpiece 20 to be reduced by matching the high axial runout region on the adapter 38 with the low axial runout region of the cutter 42. By doing so, the effect is for the axial runout regions to cancel each other to some degree, thereby reducing waviness in the workpieces's finished surface. Waviness of less than 0.0005 inch has been achieved using this method. Not only is this a significant advantage in terms of surface quality, but the effect is to improve tool life because waviness in the finished surface is usually the criterion applied to decide when to replace the cutter's inserts.

Cutter

Figure 8:
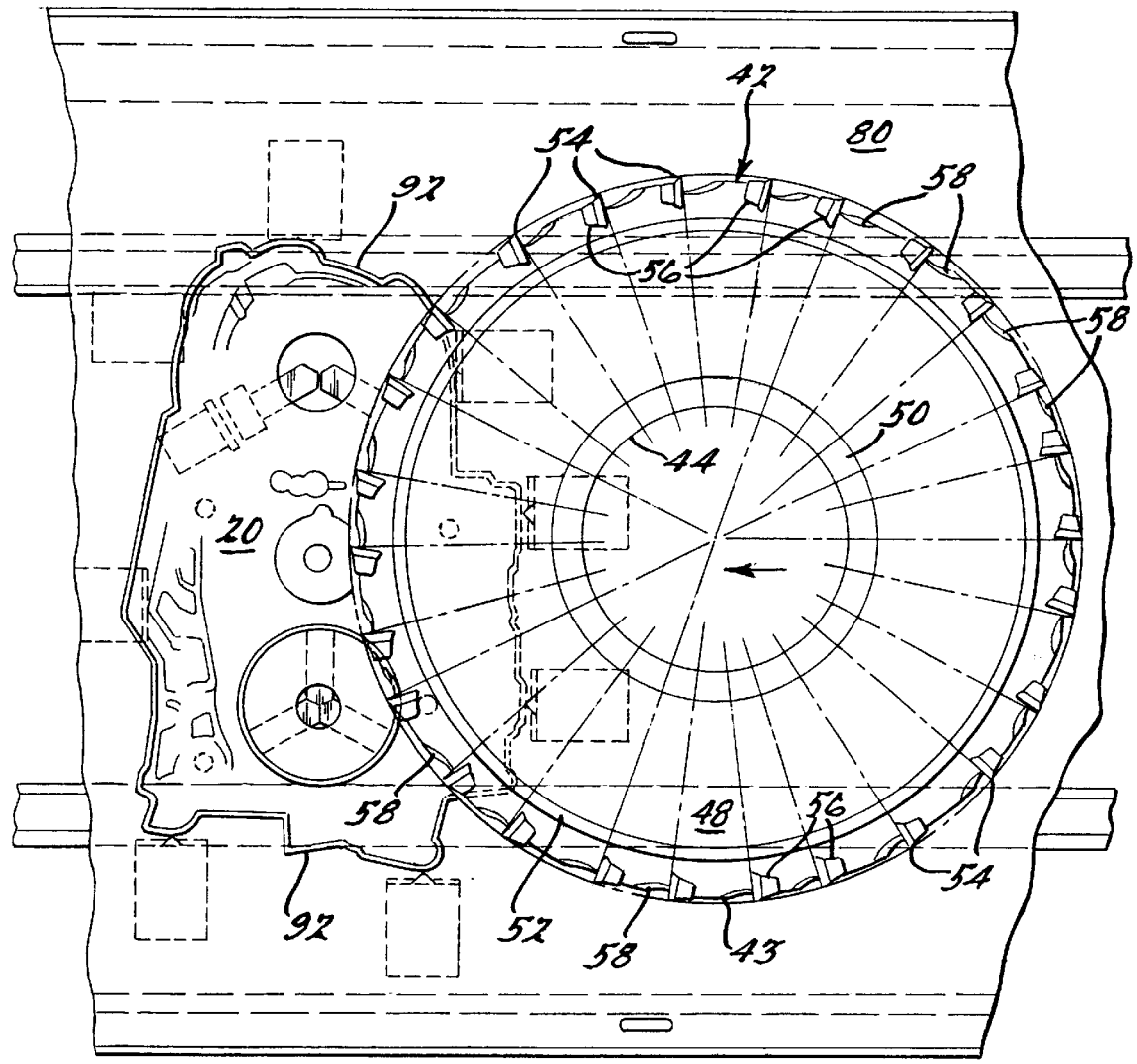
FIG. 8 is a top view of the cutter taken along line 8—8 of FIG. 7.

As can be seen in FIGS. 7 and 8, the cutter 42 is substantially disc-shaped. The cutter 42 includes a number of cutting inserts 54 mounted within a like number of pockets 56 formed on the cutter's perimeter 43. The preferred diameter defined by the placement of the inserts 54 on the cutter is approximately 20 inches. Accordingly, with a rotational speed of 2800 rpm, the surface speed of the inserts 54 is 14,660 sfm. The solid disc shape of the cutter 42 is contrary to prior art cutters, which are typically annular shaped to provide clearance between the cutter and a workpiece, to reduce weight, and to improve ease of handling. However, with the teachings of the present invention, the solid disc shape of the cutter 42 forms a planar lower surface 46 which clears the workpiece 20 by approximately 0.030 inches during machining. This minimal clearance prevents chips from accumulating in a recess of the cutter 42 which would otherwise create an imbalance and vibration in the cutter 42, while also serving to prevent the workpiece 20 from breaking free of its fixture 28 if a clamping anomaly occurs. The solid disc shape also provides added inertial mass which encourages the cutter 42 and spindle 12 to coast during repositioning.

Figure 7A:
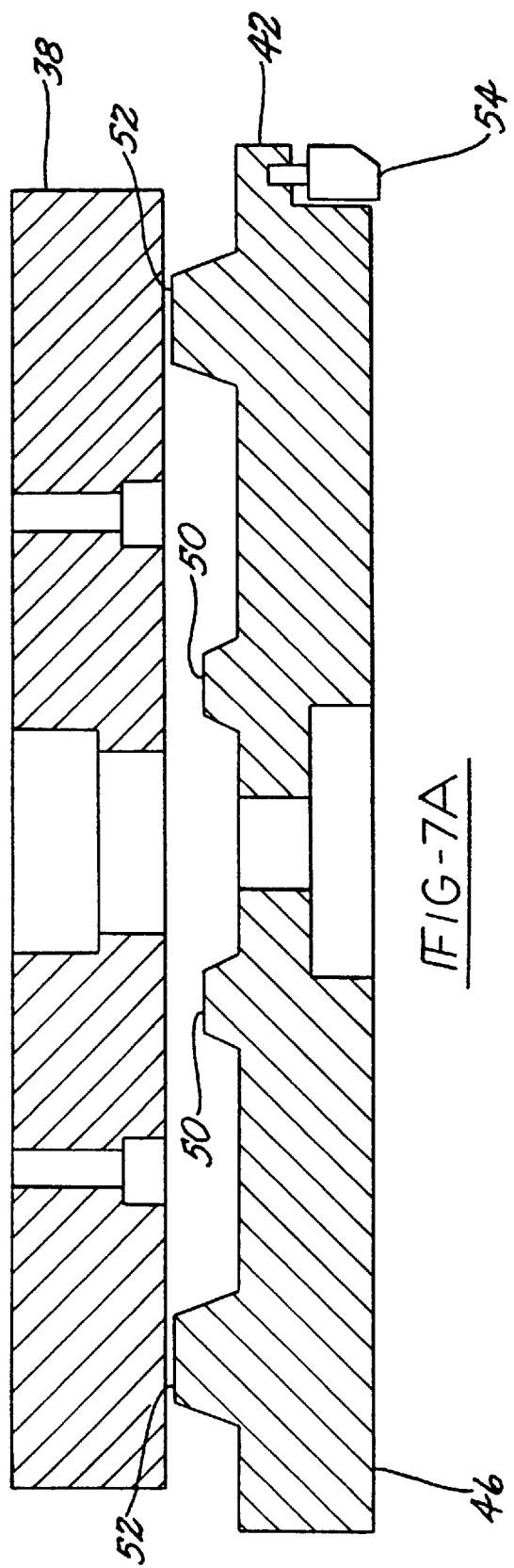
FIG. 7A is a cross-sectional detail view of the cutter body and adapter of FIG. 7 exaggerating the faces and raised portions between the adapter and cutter.

In addition to the lower surface 46, the cutter 42 is defined by the cylindrical perimeter 43, an upper surface 48 and a central opening 44. The mounting device 40 is mounted in the central opening 44 so as to be flush with the lower surface 46 of the cutter 42. The mounting device 40 abuts a radially extending should 55 in the opening 44, so as to draw the cutter 42 against the adapter 38 when the mounting device 40 is engaged with the adapter 38 and tightened. The upper surface 48 of the cutter 42 includes a central raised surface 50 circumscribing the opening 44, and a annular raised surface 52 at its perimeter 43. The annular raised surface 52 is preferably elevated approximately 0.002 inches above the central raised surface 50, as best illustrated in FIG. 7A, in which the height difference between the central raised surface 50 and the annular raised surface 52 is exaggerated.

Accordingly, with the mounting device 40 tightened, the annular raised surface 52 contacts the outer perimeter of the adapter 38 first. Thereafter, further tightening of the mounting device 40 causes the cutter 42 to distort until the central raised surface 50 also abuts the adapter 38. Consequently, the lower surface 46 of the cutter 42 is concave by approximately 0.002 inches. By distorting the cutter 42 in this manner, significant added stiffness is induced into the cutter 42 relative to its mass, permitting high speed machining of flat surfaces with significant surface interruptions, such as channels formed in automotive transmission channel plates. In addition, the annular raised surface 52 serves as a frictional drive surface for the cutter 42, with no significant torsional loads being imposed on the mounting device 40 during operation of the cutter 42.

The manner in which the cutter 42 is mounted to the adapter 38 offers an added capability of adapting the cutter 42 to produce a roughing and finishing cut within the same pass of a workpiece 20. However, the diameter of the cutter 42 must be sufficient for the workpiece 20 to fit within the diameter defined by the inserts 54. In addition, the inserts 54 must be provided with both an outer and inner radial cutting edge. As an example, the outer radial cutting edge may be adapted for roughing while the inner radial cutting edge is adapted for finishing. In a stress-free state, the cutter 42 would orient the attitude of the inserts 54 to present the inner radial cutting edges to the workpiece 20. Finally, the mounting device 40 must be adapted to be adjustable while the cutter 42 is rotating.

Applying this method, the cutter 42 is deflected by the mounting device 40 a predetermined axial distance relative to the adapter 38 prior to encountering the workpiece 20. The axial distance is chosen to both deflect the cutter 42 sufficiently to induce rigidity and alter the attitude of the inserts 54 such that they present their outer radial cutting edges to the workpiece 20 for roughing. Once the leading edge of the cutter 42 has machined the workpiece 20 and the workpiece 20 is centrally positioned beneath the cutter 42 and not subject to machining by any of the inserts 54, the mounting device 40 is adjusted to decrease the deflection in the cutter 42 while maintaining sufficient rigidity in the cutter 42. However, the change in deflection in the cutter 42 is sufficient to reverse the attitude of the inserts 54 such that they present their inner radial cutting edges to the workpiece 20 for finishing. As a result, one single pass of the cutter 42 is capable of both roughing and finishing the workpiece 20.

This capability may also be desirable in combination with the rotatable spindle 12 to provide further capability of effectively altering the insert geometry or clearances to thereby effect the characteristics of the finished surface.

As best seen in FIG. 8, the inserts 54 are irregularly spaced about the perimeter 43 of the cutter 42 in a nonrepeating fashion to substantially produce "white noise" during the operation of the cutter 42, thereby avoiding the inducement of vibration at a single frequency. In addition, the inserts 54 are recessed into their respective pockets 56 a predetermined depth toward the cutter's center. The depth to which each insert 54 is positioned is inversely proportional to the distance between the insert 54 and the insert 54 which precedes it during the machining operation. As a result, the additional material which would be removed from the workpiece 20 due to an insert's greater spacing from its preceding insert 54 is compensated for by recessing the insert 54 to reduce its depth of cut into the workpiece 20. Accordingly, chip load is substantially uniform, promoting more uniform tool wear and longer tool life. In addition, more uniform torsional loads result as each insert 54 successively engages the workpiece 20.

As shown in FIG. 9, adjacent each insert 54 is a gullet 58 formed on the perimeter 43 of the cutter 42. Conventionally, gullets 58 provide a limited void adjacent an insert 54 into which chips can escape as they leave the insert 54. In contrast, according to the present invention the gullets 58 extend completely across the full width of the cutter 42 and guide the chips in an upward direction away from the workpiece 20. As viewed from the side of the cutter 42, the circumferential width of each gullet 58 increases toward the upper surface 48 of the cutter 42. As viewed from above, illustrated in FIG. 8, the radial depth of each gullet 58 also increases toward the upper surface 48 of the cutter 42. Accordingly, as the cutter 42 is rotated at high rotational speeds, back pressure downstream of the gullet 58 is prevented. Moreover, a pressure differential is believed to be created between the upper surface 48 and the lower surface 46 of the cutter 42, further encouraging the chips to travel away from the workpiece 20 and toward the upper surface 48 of the cutter 42.

Inserts

With further reference to FIG. 9, the inserts 54 are preferably a square tungsten carbide body with a polycrystalline diamond (PCD)/tungsten carbide wafer brazed in a recess on one corner of the tungsten carbide body. Such construction is generally known in the art. The inserts 54 are also slightly wedge-shaped for purposes of increasing the clamping force upon the insert 54 when acted upon by centrifugal forces while rotating at high speeds.

As is also known in the art, diamond cutting tool materials are preferable for machining aluminum and its alloys due to their high temperature capability and their low tendency for bonding, or galling, with the aluminum during machining, as would be typical with tool steels and carbides. Traditionally, the tool industry has not recommended diamond cutting materials for cutting speeds greater than 2500 sfm due to their brittleness. However, the superior rigidity of the cutter 42 in conjunction with the ability to precisely set the toe of the cutter 42 with the spindle 12 enables the milling machine 10 of the present invention to utilize diamond inserts where the prior art has failed to achieve adequate insert life.

As illustrated for a finishing cut, the diamond inserts 54 have positive radial and axial rake angles of 5 degrees. In contrast, the diamond inserts 54 preferably have a negative radial and axial rake angle of approximately 5 degrees for roughing cuts. In addition, the corner radius of the inserts 54 is dependent upon the type of cut made. Preferably, an insert for a roughing cut has a radius of 0.060 inch while an insert for a finishing cut has a radius of 0.005 inch. The clearance angle of the inserts 54 for both types of cuts is preferably 14 degrees.

As noted above, the spacing of the inserts 54 is nonrepeating. To evaluate surface finish capability of a given insert geometry and also ascertain tool life relative to an insert's placement on the perimeter 43 of the cutter 42, testing is currently underway under manufacturing conditions in which each insert 54 is serialized with its corresponding pocket 56. The performance of each serialized insert 54 is then monitored by assessing the workpiece surface finish produced and tracking the number of workpieces machined with a given set of inserts 54. When the inserts 54 are removed, the condition of each insert 54 is then evaluated. Knowing the location of each insert 54 on the cutter 42 permits a statistical analysis of the surface finish of the part, including any tendency to produce waviness in the parts. To date 140,000 pieces per insert set have been achieved, with even greater tool life being anticipated with further modifications being suggested by present results.

Adiabatic Process

In combination, the above elements—including cutting speed, feed rate, cutting insert material and spindle and cutter construction—enable the milling machine 10 of the present invention to achieve a true adiabatic shearing operation of aluminum alloy workpieces 20 during chip formation. In the art of machining, adiabatic chip formation has been known to be attainable at sufficiently high surface speeds. However, surface speed rates which are practical for use in production manufacturing operations have been a significant limitation in the prior art, in part due to the inability to provide a spindle whose bearings will allow high rotation speeds while also providing sufficient rigidity. As a practical matter, surface speeds of greater than 5000 sfm have not been recognized as improving efficiency by the prior art when machining aluminum. In addition, the prior art has provided cutters which have limited rigidity for viable use of surface speeds of greater than 10,000 sfm. Insufficient rigidity of a cutter is incompatible with the brittle nature of a diamond cutting tool, whose use is preferable due to superior tool life and its ability to avoid galling with aluminum. Moreover, material removal rats greater than 4 cubic inches per minute per horsepower have generally been unattainable, thereby demanding excessive horsepower requirement at high surface speeds using large diameter cutters.

According to the present invention, an adiabatic process is achieved at speeds between 10,000 and 20,000 sfm, with optimal results being attained at speeds of approximately 14,660 sfm. With a diameter of 20 inches for the cutter 42 of the present invention, the required rotation speed of the cutter is approximately 2800 rpm. As noted above, the added rigidity of the cutter 42 due to its deflection as mounted to the adapter 38 is sufficient to overcome the shortcomings of the prior art attributable to insufficient rigidity for machining at these elevated speeds. In addition, lower cutting forces are also achieved at the preferred cutting speed, making the process particularly suited for machining very thin aluminum workpieces 20.

In conjunction with this preferred speed, the workpieces 20 are machined at feed rates of about 600 inches per minute, and more preferably at a rate of approximately 580 inches per minute (and specifically, 0.008 inches per tooth), as provided by the spindle 12 as it is propelled by its stroking device. Without the use of a liquid coolant and under standard manufacturing conditions the above parameters have provided a true adiabatic machining process in which both the workpieces 20, the cutter 42 and the inserts 54 exhibit no detectable temperature rise after being completely machined. Unexpectedly, the above parameters have also permitted efficiencies in excess of 7 cubic inches per minute per horsepower.

As a result, the milling machine of the present invention operates at efficiencies much greater than that known in the prior art. As an example, under actual manufacturing conditions aluminum has been machined at the rate of 720 cubic inches per minute. The machining operation of the present invention has also provided low cutting forces with the added advantage or preventing the formation of burrs and breakouts in the workpiece 20, a not uncommon occurrence when machining surfaces having irregular or intricate surface features. Moreover, surface flatness of less and 0.001 inch has been readily attainable without thermal distortion from high cutting temperatures. Tool life in excess of 130,000 workpieces has also been attained with the above described adiabatic machining operation of the milling machine 10 of the present invention.

Vacuum Shroud and Deck

Once a chip is severed from the workpiece 20 with all of the heat generated being absorbed in the chip, it is imperative to evacuate the chip from the area of the cutter 42 and the workpiece 20 to prevent heat transfer thereto. The importance of this aspect is compounded by the high material removal rate possible with the milling machine 10 of the present invention. Accordingly, to ensure that the chips are quickly evacuated, the milling machine 10 incorporates a chip removal system which includes a device for creating a pressure differential between the cutting environment, including a surrounding structure 90 enclosing the cutter 42, and the ambient surroundings. In the preferred embodiment, this device is a large capacity vacuum system (not shown) capable of creating a flow rate of approximately 3500 cubic feet per minute. However, the primary parameter has been determined to be the velocity of the air flow, which is preferably closely matched with the surface speed of the cutter 42, i.e. 14,660 feet per minute. The surrounding structure or enclosure 90 determines the air speed past the workpiece 20 and cutter 42 in conjunction with the air capacity of the vacuum system.

Figure 14:
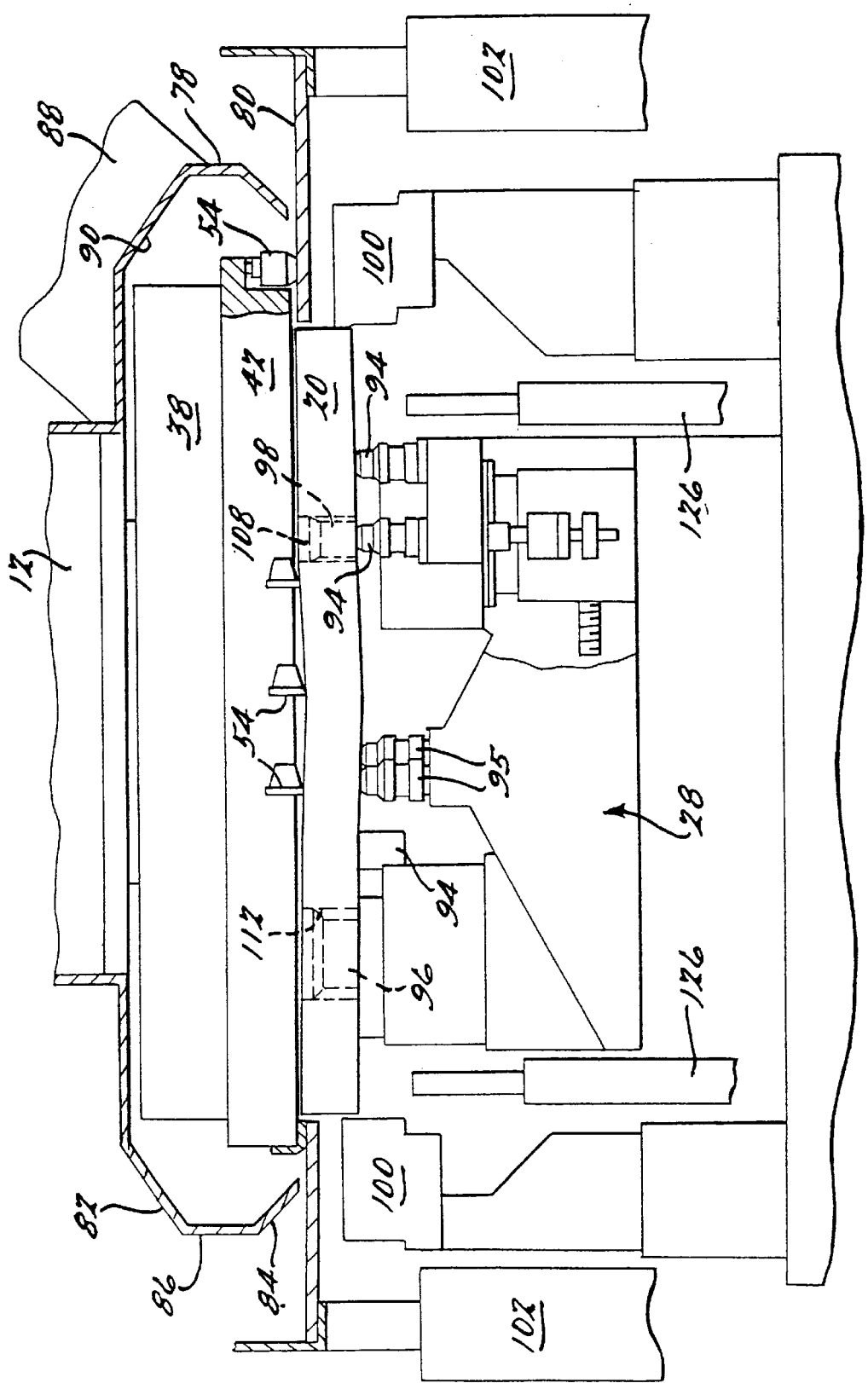
FIG. 14 is a cross-sectional view of the fixture taken along line 14—14 of FIG. 13.

As best seen in FIG. 14, the surrounding structure 90 includes a shroud 78 and a mask 80. The shroud 78 is mounted to the spindle 12 while the mask 80 is supported by a lifting mechanism 102 which transports the mask 80 between a lower machining position and an upper position. The upper position permits the transfer bars 26 to bring the workpieces 20 into position beneath the mask 80 while the mask 80 and its corresponding spindle 12 are both raised and the spindle is being repositioned for the next machining pass. The lifting mechanism 102 can be of any suitable design, such as a limited stroke hydraulic cylinder.

The shroud 78 circumscribes the cutter 42 to form a peripheral enclosure thereto, while the mask 80 has an opening 92 which closely follows the contour of the workpiece 20. Together, the mask 80 and the workpiece 20 form the lower surface of the surrounding structure 90. The air flow through the surrounding structure 90 enters between the shroud 78 and the mask 80, and between the mask 80 and the workpiece 20, as will be described in greater detail below. Along with the suspended chips, the air flow leaves the surrounding structure 90 through a duct 88, which in turn is routed to a suitable receiving container (not shown) or the like. To reduce the necessary capacity of the vacuum system, computer controlled dampers (not shown) are preferably installed in each duct 88 near the shroud 78 to provide air flow in the surrounding structure 90 only during a machining pass by that cutter 42.

As best seen in FIG. 1, the shroud 78 has an elongated portion 81 extending in the direction of the spindle's travel relative to the workpiece 20 to better prevent chips from escaping if a large concave portion is encountered in a workpiece 20. Referring again to FIG. 14, the shroud 78 has an upper and lower converging wall 82 and 84, respectively, and an intermediate wall 86. The lower converging wall 84 is disposed to be adjacent the mask 80, so as to form a predetermined clearance therebetween. The lower converging wall 84 also serves to deflect chips vertically upward into the air stream as they leave the cutter 42, thus improving the efficiency of the chip removal system. The upper converging wall 82 further serves to deflect the chips into the air flow as they enter the duct 88.

As noted above, the opening 92 in the mask 80 is sized to closely fit the contour of the workpiece 20, creating a second predetermined clearance. As will be described in greater detail below, a specially adapted fixture 28 is provided to ensure that the workpieces 20 are able to withstand the significant peripheral air movement and the pressure differential between their upper and lower surfaces. Moreover, as a safety feature the minimal 0.030 inch clearance between the lower surface 46 of the cutter 42 and the workpieces 20 also serves to prevent the workpieces 20 from becoming completely disengaged from their fixture 28. The combination of the predetermined clearances between the shroud 78 and the mask 80, and the mask 80 and the workpiece 20 determine the air speed given a flow capacity provided by the vacuum system. By sufficiently limiting the clearances, speeds of at least 14,000 feet per minute are achieved, corresponding to the surface speed of the cutter 42, and thus the speed of the chips as they leave the workpiece 20.

In addition, the air flow between the mask 80 and the workpiece 20 creates a peripheral air curtain that aids in deflecting errant chips back into the surrounding structure 90. As a result, no further enclosure of the milling machine 10 is necessary to contain the chips and protect bystanders. Accordingly, the surrounding structure 90 defined by the shroud 78 and the mask 80 is substantially smaller than enclosures typically employed in the prior art.

Fixtures

Figure 13:
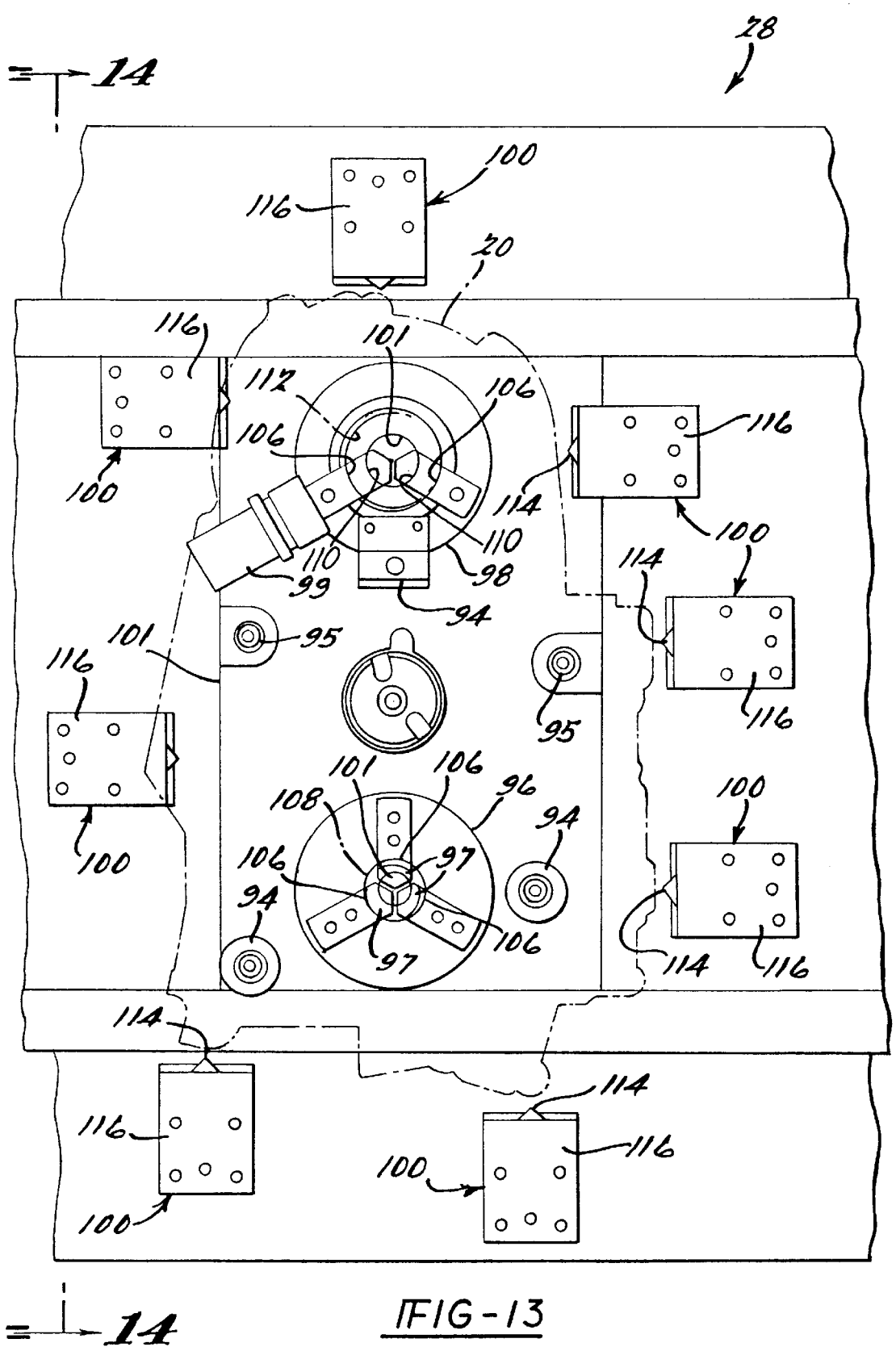
FIG. 13 is a top view of a fixture of the milling machine of FIG. 1 in accordance with a preferred embodiment of this invention.

As noted above, the fixture 28 which holds the workpieces 20 is specially adapted to withstand the loading of the workpieces 20 as they become subjected to the vacuum of the chip removal system. More importantly, the fixture 28 is specifically adapted to firmly secure extremely thin aluminum workpieces 20 in a manner that enables the cutter 42 to produce surfaces within a flatness tolerance of within 0.002 inch. As seen in FIGS. 13 and 14, each fixture 28 consists of at least three primary rests 94, one or more secondary rests 95, a three-jaw chuck 96, a two-jaw chuck 98, and a number of damping devices 100.

Generally, the primary rests 94 serve to support the workpieces 20 within the opening 92 of the mask 80 and at a predetermined vertical position relative to the cutter 42. The primary rests 94 are preferably spaced apart relative to one another or as the workpiece 20 design provides to ensure that a stable three-point platform is provided for each workpiece 20.

The three-jaw chuck 96 is a hydraulic or pneumatically-actuated device of the type well known in the art. The three-jaw chuck 96 has three jaws 97 whose composite outer perimeter is sized to engage a cavity or first aperture 108 in the workpiece 20 so as to securely clamp the workpiece 30 on the fixture 28 in the plane of the mask 80. As an added feature, the outer peripheral surface of each jaw 97 has a lower of chrome nodules 106 deposited thereon to a thickness of approximately 0.020 by which the workpiece 20 can be better gripped. The chrome nodules 106 can be deposited by any known method, such as electroplating. Attached to one of the jaws 97 so as to extend above each jaw 97 is a debris cover 101 to prevent ships from becoming trapped between the jaws 97.

The two-jaw chuck 98 is essentially a standard hydraulic or pneumatically-actuated chuck having two jaws 110 which are angularly spaced approximately 180 degrees apart from each other. With this arrangement, the two-jaw chuck 98 is adapted to engage a cavity or second aperture 112 in the workpiece 20 in a manner that, upon the jaws 110 engaging the aperture 112, the portion of the workpiece 20 between the apertures 108 and 112 is deflected slightly downward into the fixture 28. This externally induced deflection in the workpiece 20 causes rigidity in the workpiece 20, enabling the workpiece 20 to better withstand the cutting forces associated with the milling operation.

Similar to the three-jaw chuck 96, the two-jaw chuck 98 also includes a debris cover 101 and has a layer of chrome nodules 106 deposited to the outer periphery of each jaw 110 by which the workpiece 20 can be better gripped. In addition, the two-jaw chuck 98 includes an accelerometer 99 to detect vibration in the fixture 28. If the vibration exceeds a predetermined level, the output of the accelerometer 99 can be used to shut down the milling machine 10 to allow the fixture 28 to be corrected, and thereby avoid damage to the milling machine 10 and personnel.

The downward direction in which the workpiece 20 is deflected is determined by the fact that the missing jaw would be the jaw furthest from the three-jaw chuck 96. As such, the two jaws 110 engage the side of the second aperture 112 nearest the first aperture 108 so as to compress the upper surface of the workpiece 20, forcing the lower surface of the workpiece 20 downward. The extend to which the workpiece 20 is deflected is determined by the second rests 95, which are positioned a predetermined distance below the plane of the primary rests 94. In the preferred embodiment, the second rests 95 are threaded posts which can be shimmed to accurately adjust the amount of deflection in the workpiece 20. Logic dictates that the predetermined distance must be less than the flatness tolerance of the workpiece 20, and more preferably the minimum amount necessary to achieve the desired effect.

The damping devices 100 are strategically positioned about the periphery of the workpiece 20 immediately below the mask 80 to damp vibrations in the workpiece 20 and selectively deflect specific portions of the workpiece 20 either toward or away from the cutter 42. The damping devices 100 each include a hydraulically or pneumatically actuated lever 114 which is pivotably mounted to a base 116. The lever 114 is oriented to be substantially vertical, having an upper engagement end upon which is deposited a layer of chrome nodules 106 for gripping the workpiece 20 in the same manner as the two- and three-jaw chucks 98 and 96.

The damping devices 100 can be positioned relative to the workpiece 20 such that the lever 114 engages the workpiece 20 either as the upper engagement end is rotating upward toward a vertical position or rotating downward from a vertical position. Under the former condition, the associated edge of the workpiece 20 will be deflected upward toward the cutter 42. Under the latter, the associated edge of the workpiece 20 will be deflected downward away from the cutter 42. Under either circumstance, added rigidity will be induced into the workpiece 20 to better withstand the cutting forces associated with the milling operation. In addition, the damping devices 100 can be positioned such that their cumulative effect is to urge the workpiece 20 against an abutment block (not shown), so as to provide another feature which serves to secure the workpiece 20.

In operation, the transfer bars 26 lower the workpieces 20 onto the fixture 28 while the mask 80 and spindle 12 are lifted out of the way. Because the workpieces 20 are frictionally held on the transfer bars 26 by the locking arms 130, the fixture 28 forcibly strips the workpieces 20 from the transfer bars 26, assuring that the workpieces 20 properly next within the fixture 28 against the primary rests 94. Thereafter, the three-jaw chuck 96 engages its corresponding aperture 108, followed by the two-jaw chuck 98 which engages its corresponding aperture 112. The damping devices 100 then move in to abut the periphery of the workpiece 20. Together, the two-jaw chuck 98 and the damping devices 100 cooperate to selectively deflect the workpiece 20 in a manner that induces rigidity without distorting the surface of the workpiece 20 outside of the desired flatness tolerance.

A significant advantage of the milling machine 10 of the present invention is that the cutting speed is specially selected to enhance the adiabatic operation of the milling machine 10 at a high workpiece feed rate through the cutter 42. The speed and feed of the milling machine 10 are most suited to the machining of nonferrous materials, and more specifically aluminum alloys. The construction of the milling machine 10 also permits extremely high efficiencies of approximately 7 cubic inches per minute per horsepower—a factor of two greater than that known in the prior art. In addition, the lower cutting forces associated with the very high cutting speeds allow for face milling of thin, nonrigid workpieces 20, such as transmission channel plates. Consequently, the milling machine 10 of the present invention is also well suited for machining flat surfaces having complex surface patterns with significant surface interruptions, such as channels formed in automotive transmission channel plates.

In addition, the manner in which the chips are handled after machining further complements the milling machine's adiabatic operation. The chip removal system precludes chips from folding the workpieces 20 and cutter 42 so as to prevent heat transfer thereto. The preferred operation of the milling machine 10 is dry—i.e. without cooling liquids or lubricants. Accordingly, an added benefit is that the chips can be easily recycled without the need to separate the chips from a liquid. Another advantage to dry machining is that the machining operation can be conducted in a more environmentally sound manner.

Another significant advantage of the present invention is that the cutters 42 are attached to their respective spindles 12 in a manner which supplements their rigidity, thus allowing the use of diamond cutting inserts 54 for machining aluminum at very high speeds. The cutters 42 are also formed to discourage chips from accumulating between the cutters 42 and workpieces 20. In addition, the orientation of the spindles 12 can be readily adjusted with the eccentric shaft 74 to ensure that the toe of each cutter 42 is appropriate for tolerance variations and for the type of cut desired, i.e. roughing or finishing. Accordingly, the orientation and construction of the cutter and spindle are adapted to promote a fully adiabatic machining operation.

Finally, the manner in which the workpieces 20 are fixtured relative to the cutter 42 and transferred into and out of the fixture 28 promotes precision and secure positioning and machining of the workpieces 20 under high volume manufacturing conditions. The fixtures 28 are able to deflect each workpiece 20 sufficiently to induce added rigidity into the workpiece 20 while remaining within the tolerance requirement for the surface of the workpiece 20. The fixtures 28, transfer bars 26 and transfer arms 24 are particularly adapted to be regulated by a suitable controller which would ensure synchronized cooperation between each device.

In contrast to prior art laboratory testing, the advantages of the milling machine 10 can be realized within a typical manufacturing environment at a combination of surface speeds, fed rates, rigidity and power which were previously unviable for such purposes. The milling machine 10 of the present invention has overcome previous bearing limitations by increasing the diameter of the cutter 42 to reduce the necessary spindle speed. The cutter 42 of the present invention is permitted to have a large diameter due to its solid construction and the added rigidity induced by the manner in which the mounting device 40 is able to adjustable clamp the cutter 42 to the adapter 38. The added rigidity of the cutter 42 also permits the use of diamond cutting inserts 54, which would otherwise have low tool life due to vibration. Tool life and uniform chip load are also promoted by locating the inserts 54 in a nonrepeating fashion on the perimeter 43 of the cutter 42 while simultaneously compensating for their irregular spacing by altering the radial position of each insert 54. Finally, the unique manner in which the chip removal system is able to completely evacuate the chips from the area of the cutter 42 and workpieces 20 enables the milling machine 10 to sustain the extremely high material removal rate which results from the very high machining surface speed. The cutter 42 is provided with gullets 58 which also assist in evacuating the chips from within the surrounding structure 90 surrounding the cutter 42 and workpiece 20. The chip removal system of the present invention also provides for superior tool life in excess of 130,000 workpieces for cutter set by preventing the recutting of chips. Each of the above features cooperate to provide an adiabatic face milling machine 10 which is practical for modern manufacturing conditions.

While the invention has been described in terms of a preferred embodiment, it is apparent that other forms could be adopted by one skilled in the art. Accordingly, the scope of the invention is to be limited only by the following claims.

What is claimed is:

1. The fixturing device for supporting a workpiece during a machining operation, said fixturing device comprising:

means for supporting said workpiece on at least three points;

means adjacent said support means for engaging at least one edge of said workpiece, said engaging means deflecting at least a portion of said workpiece in a direction towards said support means; and secondary means for supporting said workpiece located adjacent said engaging means, said secondary support means having an elevation which is a predetermined distance below a plane defined by said at least three points, said secondary support means limiting the deflection of said workpiece to said predetermined distance;

whereby added rigidity is induced in said workpiece as a result of deflecting said workpiece said predetermined distance.

2. The fixturing device of claim 1 further comprising an abutment member adjacent said support means, wherein said engaging means creates a resultant force which urges said workpiece against said abutment member.

3. The fixturing device of claim 1 wherein said engaging means comprises a plurality of damping devices.

4. The fixturing device of claim 3 wherein said plurality of damping devices each comprise an engagement surface having a coarse chrome layer deposited thereon.

5. A fixturing device for supporting a workpiece having an aperture therein, said workpiece having at least one generally planar surface and having at least one edge extending generally transverse to said surface during a machining operation, said fixturing device comprising:

means for supporting said workpiece; and means for inducing a force in said workpiece, said force inducement means being spaced a predetermined distance from said support means, said force inducement means engaging said at least one edge of said workpiece and deflecting at least a portion of said surface of said workpiece a predetermined distance toward said fixturing device whereby engagement of said at least one edge of said workpiece by said force inducement means deflects at least a portion of said surface of said workpiece a predetermined distance such that added rigidity is induced in said workpiece as a result of said deflection of said at least a portion of said workpiece.

6. The fixturing device of claim 5 wherein said support means comprises at least three support members.

7. The fixturing device of claim 5 wherein said predetermined distance is less than a predetermined tolerance of said workpiece.

8. The fixturing device of claim 5 further comprising at least one abutment member located adjacent said support means, wherein said force inducement means creates a resultant force which urges said workpiece against said at least one abutment member.

9. The fixture device as claimed in claim 5 wherein said force inducement means further comprises a plurality of damping devices located about the periphery of said workpiece, each of said plurality of damping devices having an engagement surface for engaging the peripheral edge of said workpiece such that engagement of said engagement surface of each of said plurality of damping devices deflects at least a portion of said workpiece a predetermined distance towards said fixturing device such that added rigidity is induced in said workpiece as a result of said deflecting of said workpiece.

* * * * *